(12) United States Patent
Miyanaga et al.

(10) Patent No.: US 7,664,093 B2
(45) Date of Patent: Feb. 16, 2010

(54) WIRELESS TRANSMISSION SYSTEM AND WIRELESS TRANSMISSION METHOD AND WIRELESS STATION FOR USE THEREIN

(75) Inventors: Kenji Miyanaga, Osaka (JP); Hideki Nakahara, Hyogo (JP); Hidetoshi Yamasaki, Hyogo (JP); Hitoshi Takai, Osaka (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 10/569,730

(22) PCT Filed: Sep. 16, 2005

(86) PCT No.: PCT/JP2005/017567

§ 371 (c)(1),
(2), (4) Date: Feb. 28, 2006

(87) PCT Pub. No.: WO2006/030987

PCT Pub. Date: Mar. 23, 2006

(65) Prior Publication Data

US 2008/0198835 A1    Aug. 21, 2008

(30) Foreign Application Priority Data

Sep. 17, 2004   (JP)   ............... 2004-272490

(51) Int. Cl.
*H04J 3/06*   (2006.01)
(52) U.S. Cl. .................. 370/350; 370/347; 370/329; 455/450; 455/452.2; 455/101; 375/267
(58) Field of Classification Search ............. 370/347, 370/350; 455/450–452.2; 375/267, 344
See application file for complete search history.

(56) References Cited

U.S. PATENT DOCUMENTS 5,347,535 A * 9/1994 Karasawa et al. ........... 370/342

(Continued)

FOREIGN PATENT DOCUMENTS

GB          1 576 347         10/1980

(Continued)

OTHER PUBLICATIONS

H. Takai, "BER Performance of Anti-Multipath Modulation Scheme PSK-VP and its Optimum Phase-Waveform", IEEE, Trans. Veh. Technol., vol. VT-42, Nov. 1993, pp. 625-640.

(Continued)

*Primary Examiner*—Sharad Rampuria
(74) *Attorney, Agent, or Firm*—Wenderoth, Lind & Ponack, L.L.P.

(57) ABSTRACT

A wireless station capable of increasing the probability that a path diversity effect can be obtained in a case where a plurality of wireless stations transmit packets using a modulation/demodulation scheme with an anti-multipath property. A delay amount determining section (48) randomly selects a delay amount from among a plurality of candidate values. A transmission timing control section (47) determines a transmission start timing, at which to start the packet transmission, to be a timing obtained by delaying a reference timing by the delay amount selected by the delay amount determining section. At the transmission start timing, a modulation section (49) transmits the packet via an RF section (42) and an antenna (41). The difference between the candidate values is greater than or equal to a predetermined delay resolution, and the difference between a maximum candidate value and a minimum candidate value is less than or equal to a predetermined maximum delay.

12 Claims, 28 Drawing Sheets

U.S. PATENT DOCUMENTS

| | | | |
|---|---|---|---|
| 5,504,774 A * | 4/1996 | Takai et al. | 375/134 |
| 5,663,990 A * | 9/1997 | Bolgiano et al. | 375/138 |
| 5,751,704 A * | 5/1998 | Kostic et al. | 370/335 |
| 6,078,568 A * | 6/2000 | Wright et al. | 370/312 |
| 6,317,854 B1 * | 11/2001 | Watanabe | 714/749 |
| 6,469,992 B1 * | 10/2002 | Schieder | 370/329 |
| 6,496,481 B1 * | 12/2002 | Wu et al. | 370/242 |
| 7,006,798 B2 * | 2/2006 | Miyoshi et al. | 455/67.11 |
| 7,012,883 B2 * | 3/2006 | Jalali et al. | 370/208 |
| 7,085,572 B2 * | 8/2006 | Ishida | 455/450 |
| 7,130,636 B2 * | 10/2006 | Kitazawa et al. | 455/452.1 |
| 7,391,750 B2 * | 6/2008 | Kim et al. | 370/329 |
| 7,460,524 B2 * | 12/2008 | Khan | 370/353 |
| 7,515,574 B2 * | 4/2009 | Huang et al. | 370/338 |
| 2001/0024434 A1 * | 9/2001 | Ayyagari et al. | 370/347 |
| 2005/0058097 A1 * | 3/2005 | Kang et al. | 370/329 |
| 2005/0147079 A1 * | 7/2005 | Lakkis | 370/350 |

FOREIGN PATENT DOCUMENTS

| | | | |
|---|---|---|---|
| GB | 1576347 A | * 10/1980 | |
| GB | 2 237 706 A | 5/1991 | |
| JP | 2000-115181 | 4/2000 | |

OTHER PUBLICATIONS

S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference 1987, Jun. 1987, pp. 66-71.

S. Ariyavisitakul, S. Yoshida, F. Ikegami, T. Takeuchi, "A Novel Anti-Multipath Modulation Technique DSK", IEEE Trans. Communication, vol. COM-35. No. 12, Dec. 1987, pp. 1252-1264.

* cited by examiner

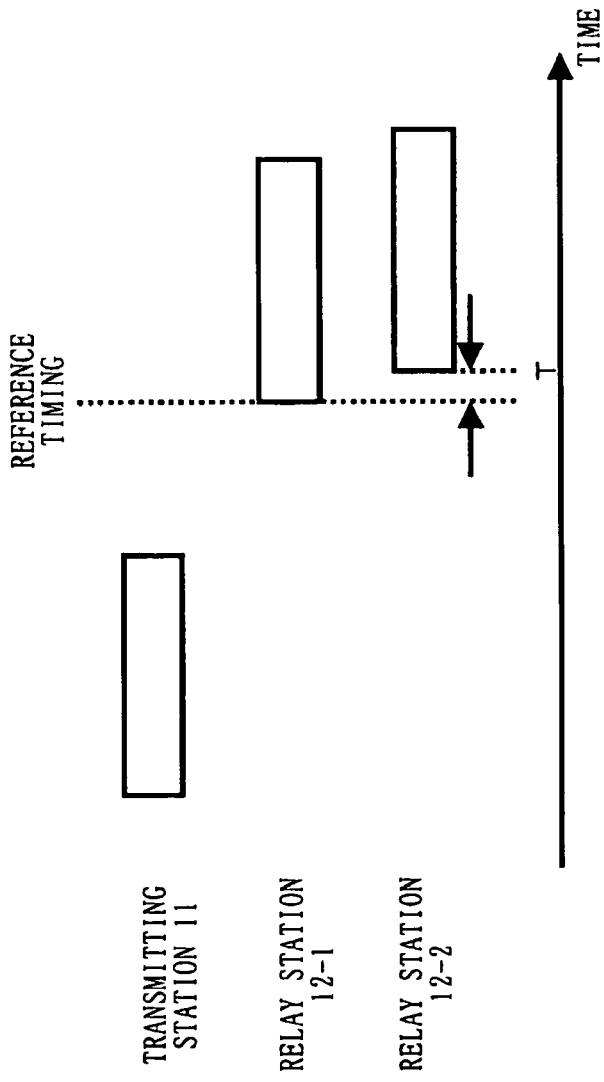

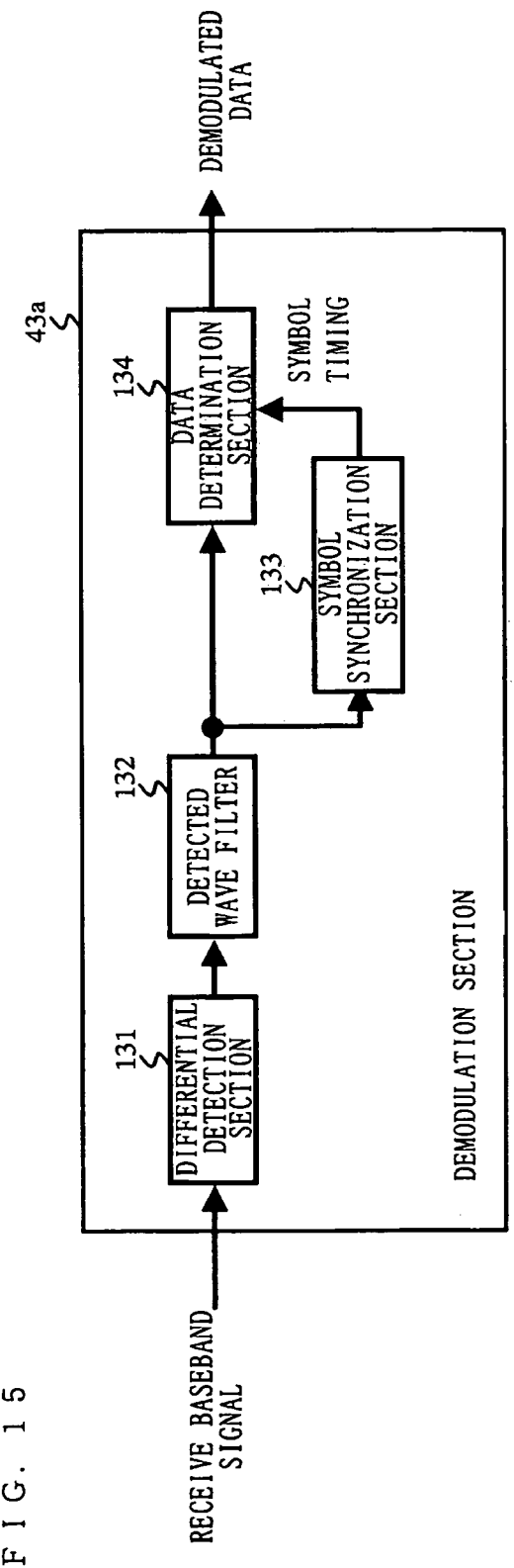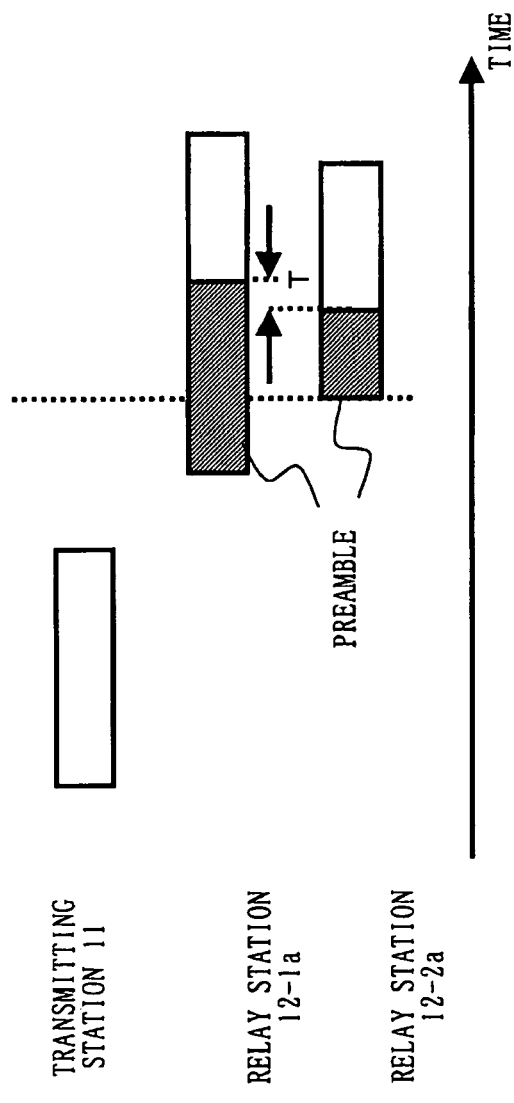

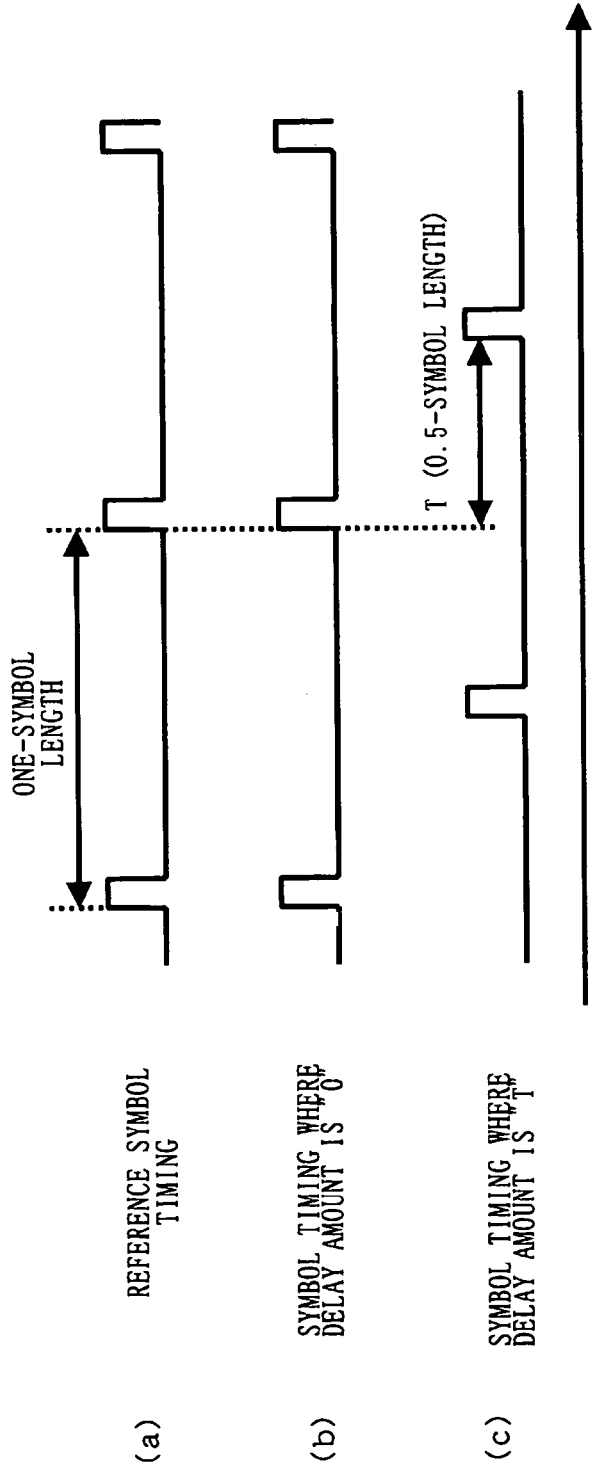

WIRELESS TRANSMISSION SYSTEM AND WIRELESS TRANSMISSION METHOD AND WIRELESS STATION FOR USE THEREIN

BACKGROUND OF THE INVENTION

1. Field of the Invention

The present invention relates to a wireless transmission system and a wireless transmission method in which a plurality of wireless stations transmit packets, and to a wireless station for use therein. More particularly, the present invention relates to a wireless transmission system and a wireless transmission method in which a plurality of wireless stations transmit packets using a modulation/demodulation scheme with an anti-multipath property, and to a wireless station for use therein.

2. Description of Related Art

Typically, in wireless communication, transmitted signals arrive at the receiver via a plurality of propagation paths and thus with different propagation time lengths, thereby causing multipath fading. Modulation/demodulation schemes with an anti-multipath property have been used in order to prevent the deterioration of transmission characteristics due to multipath fading.

For example, modulation/demodulation schemes with an anti-multipath property include a spread spectrum scheme, an orthogonal frequency division multiplexing (OFDM) scheme in which information is transmitted while being distributed among a large number of subcarriers arranged over a wide frequency range, and a so-called "anti-multipath modulation scheme" in which an anti-multipath property is exerted by providing a phase or amplitude redundancy in the transmitted symbols. Anti-multipath modulation schemes include a PSK-VP (phase shift keying with varied phase) scheme (Non-Patent Document 1) in which a convex-shaped phase redundancy is provided or a PSK-RZ (return to zero phase shift keying) scheme (Non-Patent Document 2) in which an amplitude redundancy is provided.

For example, spread spectrum schemes include a direct sequence spread spectrum (DSSS) scheme in which an original signal is multiplied by a spread signal having a wider band than that of the original signal, a frequency hopping spread spectrum (FHSS) scheme in which the frequency is hopped over a wide band, and a time hopping spread spectrum (THSS) scheme in which a signal is spread with a wideband impulse. Even where an ordinary single carrier modulation scheme is used for wireless communication, it is possible to provide an anti-multipath property by using an equalizer on the receiver side.

By using such a modulation/demodulation scheme with an anti-multipath property for communication, it is possible not only to prevent the deterioration of transmission characteristics due to a multipath waveform distortion, but also to actively improve the transmission characteristics with a plurality of delayed waves being received with diversity (path diversity) if there is an appropriate TDOA (time difference of arrival) between element waves forming the multipath (delayed waves) arriving at the receiver. Thus, with a path diversity, it is possible to obtain an effect of improving the transmission characteristics.

The appropriate minimum and maximum TDOAs with which a path diversity effect can be obtained will hereinafter be referred to as the "delay resolution" and the "maximum delay", respectively. The delay resolution and the maximum delay may be determined based on the principle of the modulation/demodulation scheme used, or based on the parameters and/or limitations on implementation of the modulation/demodulation scheme.

For example, with the DSSS scheme, it is possible, on the receiver side, to separate a received signal into delayed wave components and combine them together (RAKE reception) to obtain a path diversity effect, with a delay resolution corresponding to the 1-chip length of the spread code and a maximum delay corresponding to a value that is less than the spread code length.

With the OFDM scheme, the delayed wave components are absorbed at the guard interval set for the signal, whereby the maximum delay corresponds to the guard period. Intersymbol interference does not occur if the TDOA between delayed waves is within the guard interval. Moreover, since an error correction operation is normally performed over a plurality of subcarriers, information can be reproduced even if some subcarriers have errors therein due to a multipath distortion. The delay resolution corresponds to a value around the inverse of the frequency bandwidth. Thus, with the OFDM scheme, it is possible to obtain a path diversity effect (where the delay resolution is around the inverse of the frequency bandwidth) based on the effect of the guard interval and on the frequency diversity effect provided by scattering pieces of information over a wide frequency band and collecting the pieces together.

Where the PSK-VP scheme or the PSK-RZ scheme is used, the delay resolution corresponds to an amount of time that is around several times less than the symbol length, and the maximum delay corresponds to a value that is less than the 1-symbol length. Where a single carrier scheme such as the PSK scheme or the QAM scheme is used on the transmitter side, the receiver side demodulates the signal with an equalizer using a tapped delay line. In such a case, the delay resolution corresponds to the 1-symbol length, and the maximum delay corresponds to an amount of time that is determined by the number of taps.

In recent years, researches have been undertaken for systems in which a plurality of wireless stations engage in wireless communication by relaying data from others, such as a multihop system. FIG. 33 shows a configuration of a conventional wireless transmission system disclosed in Patent Document 1. Referring to FIG. 33, the wireless transmission system includes six wireless stations 1171 to 1176. FIG. 34 is a schematic diagram showing the transmission timing of packets transmitted by wireless stations shown in FIG. 33.

First, the wireless station 1171 transmits a broadcast packet. Wireless stations that can receive the packet transmitted by the wireless station 1171 are the wireless stations 1172 and 1173, which are located close to the wireless station 1171. The wireless stations 1172 and 1173 wait, after the packet reception is completed, for a predetermined transmission timing, and then simultaneously transmit packets.

Then, wireless stations that can receive the packets transmitted by the wireless stations 1172 and 1173 are the wireless stations 1174 and 1175. The wireless stations 1174 and 1175 also wait, after the packet reception is completed, for a predetermined transmission timing, and then simultaneously transmit packets. Then, the wireless station 1176 receives the packets transmitted by the wireless stations 1174 and 1175. As described above, Patent Document 1 uses an orthogonal frequency division multiplexing (OFDM) scheme with an anti-multipath property in a multihop system, whereby interference does not occur even if a plurality of wireless stations simultaneously transmit packets. Moreover, as compared with a case where a packet is transmitted in multihop transmission successively from the wireless station 1171 to 1172, 1173, 1174, 1175 and then to 1176, it is possible to shorten the amount of time required for the broadcast packet transmission, and thus to improve the transmission efficiency.

As described above, with the conventional wireless transmission system disclosed in Patent Document 1, it is possible to realize an efficient multihop transmission with a plurality of wireless stations using a modulation/demodulation scheme with an anti-multipath property.

Patent Document 1: Japanese Laid-Open Patent Publication No. 2000-115181

Non-Patent Document 1: H. Takai, "BER Performance of Anti-Multipath Modulation Scheme PSK-VP and its Optimum Phase-Waveform", IEEE, Trans. Veh. Technol., Vol. VT-42, November 1993, pp. 625-639

Non-Patent Document 2: S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference 1987, June 1987, pp. 66-71

Non-Patent Document 3: S. Ariyavisitakul, S. Yoshida, F. Ikegami, T. Takeuchi, "A Novel Anti-Multipath Modulation Technique DSK", IEEE Trans. Communication, Vol. COM-35, No. 12, December 1987, pp. 1252-1264

BRIEF SUMMARY OF THE INVENTION

Where packets transmitted from a plurality of wireless stations are received on the receiver side with an appropriate TDOA, a modulation/demodulation scheme with an anti-multipath property can be used to obtain a path diversity effect and to actively improve the transmission characteristics. However, as described above, in order to obtain a path diversity effect, the TDOA between delayed waves needs to be within a predetermined range. Particularly, if the TDOA between delayed waves is too short, it is not possible to obtain the effect of actively improving the transmission characteristics by a path diversity.

For example, in the conventional wireless transmission system disclosed in Patent Document 1, the wireless stations 1172 and 1173 simultaneously transmit packets. Therefore, if there is only a small difference between the propagation time length from the wireless station 1172 to the wireless station 1174 and that from the wireless station 1173 to the wireless station 1174, the wireless station 1174 will receive packets from the wireless stations 1172 and 1173 substantially at the same time. Then, the two arriving waves cannot be separated from each other, and the path diversity effect cannot be obtained. Moreover, if the two received signals have exactly opposite phases, the signals will cancel each other, which not only prevents the path diversity effect from being exerted, but significantly deteriorates the transmission characteristics. The conventional wireless transmission system disclosed in Patent Document 1 aims at improving the packet transmission efficiency, and gives no consideration for effectively obtaining the path diversity effect.

Therefore, the present invention provides a wireless transmission system and a wireless transmission method capable of increasing the probability that a path diversity effect is obtained where a plurality of wireless stations transmit packets using a modulation/demodulation scheme with an anti-multipath property, and provides a wireless station for use therein.

The present invention provides a wireless station for use in a wireless transmission system in which a plurality of wireless stations transmit packets, wherein a path diversity system is formed by a transmitter-side wireless station, a multi-path channel and a receiver-side wireless station, the wireless station including: a delay amount determining section for randomly selecting a delay amount to be given to the packet from among a plurality of candidate values; a transmission timing control section for determining a transmission start timing, at which to start the packet transmission, to be a timing obtained by delaying a reference timing to be a reference for the packet transmission by the delay amount selected by the delay amount determining section; and a transmitting section for transmitting the packet at the transmission start timing determined by the transmission timing control section, wherein a difference between the candidate values is greater than or equal to a predetermined delay resolution, and a difference between a maximum candidate value and a minimum candidate value is less than or equal to a predetermined maximum delay.

According to the present invention, the wireless station randomly selects a delay amount from among a plurality of candidate values, and transmits a packet while delaying the reference timing by the selected delay amount. Thus, it is less likely that the arrival time of the packet transmitted by the wireless station coincides with that of a packet transmitted by another wireless station, whereby it is possible to increase the probability that a path diversity effect can be obtained. Moreover, the difference between the candidate values is greater than or equal to the delay resolution, and the difference between the maximum candidate value and the minimum candidate value is less than or equal to the maximum delay, whereby a path diversity effect can be obtained if the wireless station selects a delay amount different from that selected by another wireless station.

Preferably, the predetermined delay resolution and the predetermined maximum delay are set to values such that a plurality of delayed waves can be received with path diversity.

Preferably, the wireless station further includes a receiving section for receiving a packet to be transmitted to another wireless station, wherein the transmitting section transmits the packet received by the receiving section.

Thus, a wireless station can relay a packet transmitted from another wireless station.

In one embodiment, the wireless station further includes a re-transmission timing control section for determining a re-transmission start timing, at which to re-transmit a packet of which the wireless station is a sender, to be a timing obtained by adding the delay amount determined by the delay amount determining section to the reference timing after the packet of which the wireless station is the sender is transmitted to a non-recipient wireless station, wherein the transmitting section transmits the packet to a recipient wireless station at the re-transmission start timing determined by the re-transmission timing control section.

Thus, as compared with a case where only wireless stations other than the sender of a packet transmit the packet, the number of wireless stations that transmit the packet increases, whereby it is possible to further increase the probability that a path diversity effect can be obtained.

Preferably, when the packet is re-transmitted, the delay amount determining section of the sender wireless station selects a delay amount different from the delay amount candidate values stored in other stations.

Thus, it is possible to ensure that a packet transmitted by the sender wireless station and the packet transmitted by a non-sender wireless station arrive on the receiver side at different timings. Therefore, a path diversity effect of two or more branches can reliably be obtained on the receiver side.

In one embodiment, the wireless station further includes: an estimate operation determination section for determining whether or not to estimate a delay amount selected by another wireless station transmitting the packet; a packet producing section, wherein if the estimate operation determination section determines not to estimate the delay amount selected by the other wireless station, the packet producing section produces a packet having a longer preamble than that of a packet produced by a wireless station that determines to estimate the delay amount selected by the other wireless station; and a delay amount estimating section, wherein if the estimate operation determination section determines to estimate the delay amount selected by the other wireless station, the delay amount estimating section estimates the delay amount selected by the other wireless station based on a preamble contained in a packet transmitted by the other wireless station, wherein: the delay amount determining section selects one of the delay amount candidate values that is different from the value estimated by the delay amount estimating section; when a packet is produced by the packet producing section, the transmission timing control section determines the transmission start timing to be the reference timing plus the delay amount minus a difference in length between a preamble contained in the packet produced by the packet producing section and a preamble contained in the packet received by the receiving section; and the transmitting section transmits the packet produced by the packet producing section.

Thus, a wireless station selects whether or not to estimate the delay amount selected by another wireless station, and estimates the delay amount given to a packet by the other wireless station, which has determined not to estimate the delay amount of the other station. Therefore, as compared with a case where only the delay amount is selected, it is possible to further increase the probability that a path diversity effect can be obtained.

In one embodiment, the delay amount estimating section includes: a symbol timing recovering section for recovering a symbol timing of a preamble contained in a packet transmitted at the transmission start timing; and a delay amount comparing section for estimating a delay amount selected by another wireless station transmitting the packet by comparing the symbol timing recovered by the symbol timing recovering section with a reference symbol timing.

Thus, it is possible to estimate the delay amount selected by the other wireless station by recovering the symbol timing of the preamble of the packet.

In one embodiment, the delay amount estimating section includes: a reception level detection section for detecting a reception level of a packet transmitted at the transmission start timing; and a delay amount comparing section for estimating a delay amount selected by another wireless station transmitting the packet by comparing a timing at which the reception level is detected by the reception level detection section with a reference symbol timing.

Thus, it is possible to estimate the delay amount selected by the other station based on the reception level of the received packet.

In one example, a PSK-VP scheme is used as the modulation scheme. In another example, an OFDM scheme is used as the modulation scheme and the demodulation scheme.

The present invention provides a wireless transmission system in which a plurality of wireless stations transmit packets, wherein a path diversity system is formed by a transmitter-side wireless station, a multi-path channel and a receiver-side wireless station, each wireless station including: a delay amount determining section for randomly selecting a delay amount to be given to the packet from among a plurality of candidate values; a transmission timing control section for determining a timing, at which to start the packet transmission, to be a timing obtained by delaying a reference timing to be a reference for the packet transmission by the delay amount selected by the delay amount determining section; a transmitting section for transmitting the packet to a recipient wireless station at the timing determined by the transmission timing control section; and a receiving section for receiving a packet transmitted from another wireless station, wherein a difference between the candidate values is greater than or equal to a predetermined delay resolution, and a difference between a maximum candidate value and a minimum candidate value is less than or equal to a predetermined maximum delay.

The present invention provides a method for transmitting a packet from a wireless station for use in a wireless transmission system in which a plurality of wireless stations transmit packets, wherein a path diversity system is formed by a transmitter-side wireless station, a multi-path channel and a receiver-side wireless station, the method including the steps of: randomly selecting a delay amount to be given to the packet from among a plurality of candidate values; determining a timing, at which to start the packet transmission, to be a timing obtained by delaying a reference timing to be a reference for the packet transmission by the delay amount selected in the step of selecting the delay amount; and transmitting the packet at the timing determined in the step of determining the packet transmission start timing, wherein a difference between the candidate values is greater than or equal to a predetermined delay resolution, and a difference between a maximum candidate value and a minimum candidate value is less than or equal to a predetermined maximum delay.

The present invention provides a method for use in a system in which a plurality of wireless stations transmit the same packet at a predetermined timing, wherein a path diversity system is formed by a transmitter-side wireless station, a multi-path channel and a receiver-side wireless station, the method including the steps of: randomly selecting a delay amount to be given to the packet from among a plurality of candidate values; determining a timing, at which to start the packet transmission, to be a timing obtained by delaying a reference timing to be a reference for the packet transmission by the delay amount selected in the step of selecting the delay amount; transmitting the packet to a recipient wireless station at the timing determined in the step of determining the packet transmission start timing; and receiving a packet transmitted from another wireless station, wherein a difference between the candidate values is greater than or equal to a predetermined delay resolution, and a difference between a maximum candidate value and a minimum candidate value is less than or equal to a predetermined maximum delay.

Thus, the present invention provides a wireless transmission system and a wireless transmission method capable of increasing the probability that a path diversity effect is obtained where a plurality of wireless stations transmit packets using a modulation/demodulation scheme with an anti-multipath property, and to provide a wireless station for use therein.

BRIEF DESCRIPTION OF THE DRAWINGS

FIG. 7 shows an example of a packet transmission timing in the present embodiment.

FIG. 8 shows combinations of delay amounts selected by two relay stations.

FIG. 13 is a flow chart showing an operation of the relay station 12a.

FIG. 14 is a block diagram showing a configuration of the relay station 12a.

FIG. 15 is a block diagram showing a configuration of a demodulation section 43a used with the PSK-VP scheme.

FIG. 16 shows an example of a packet transmission timing of the third embodiment.

FIG. 17 shows examples of symbol timings obtained by a clock recovery operation based on a preamble.

FIG. 18 shows combinations of packets transmitted by relay stations in a case where there are two relay stations in the wireless transmission system.

DESCRIPTION OF THE REFERENCE CHARACTERS

Figure 1:
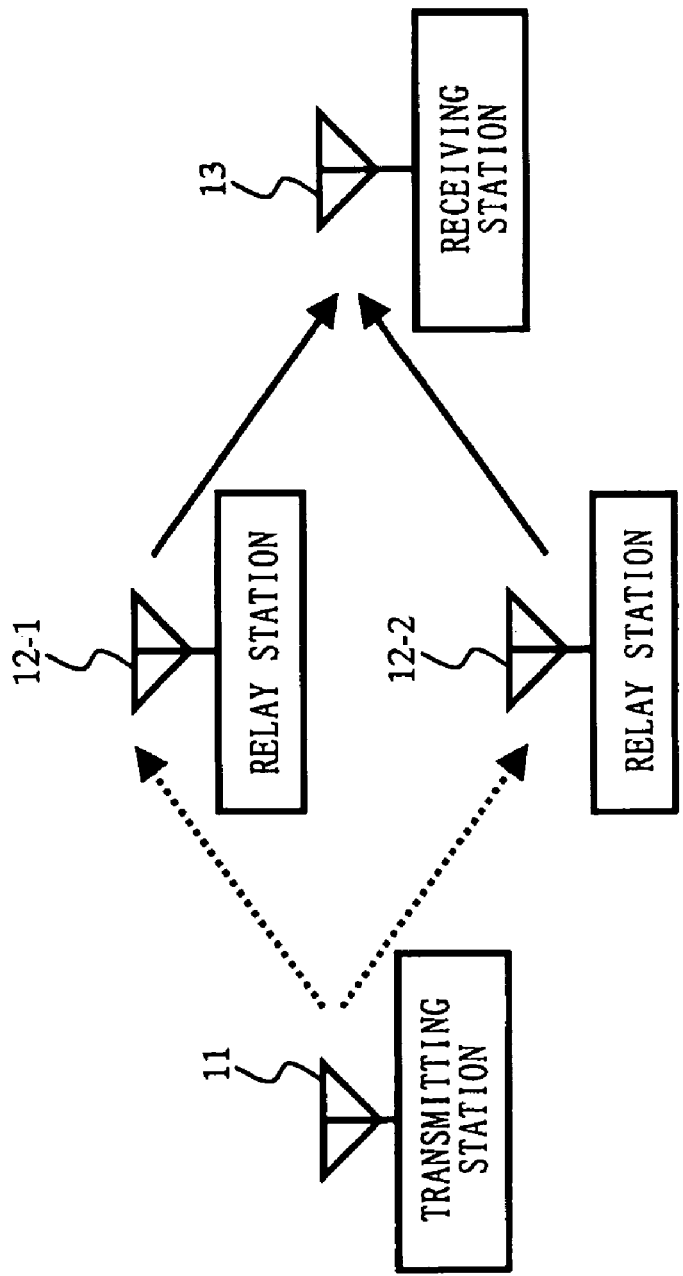
FIG. 1 shows a configuration of a wireless transmission system according to a first embodiment of the present invention.

11 Transmitting station
12 Relay station
13 Receiving station
43 Demodulation section
44 Self-destined packet determination section
45 Self-destined packet processing section
46 Transmit packet processing section
47 Transmission timing control section
48, 123 Delay amount determining section
49 Modulation section
121 Estimate operation determination section
122 Delay amount estimating section

DETAILED DESCRIPTION OF THE INVENTION

Embodiments of the present invention will now be described with reference to the drawings. In this specification, a wireless transmission system wherein a path diversity system is formed by a transmitter-side wireless station, a multi-path channel and a receiver-side wireless station is defined as a system capable of transmitting/receiving packets using an anti-multipath modulation/demodulation scheme. Examples of path diversity systems include: (1) a system in which data is modulated by a transmitter-side wireless station by using a spread spectrum scheme (e.g., a DSSS scheme, a FHSS scheme or a THSS scheme) and is demodulated by a receiver-side wireless station by using a spread spectrum scheme; (2) a system in which data is modulated by a transmitter-side wireless station by using an OFDM scheme and is demodulated by a receiver-side wireless station by using an OFDM scheme; (3) a system in which data is modulated by a transmitter-side wireless station by using an anti-multipath modulation scheme (e.g., a PSK-VP scheme, a PSK-RZ scheme or a DSK scheme) and is demodulated by a receiver-side wireless station by using a demodulation scheme corresponding to the anti-multipath modulation scheme; and (4) a system in which data is modulated by a transmitter-side wireless station by using a single carrier modulation scheme (e.g., a PSK scheme or a QAM scheme) and is demodulated by a receiver-side wireless station by using an equalizer. Note that the present invention is not limited to those particular path diversity systems as set forth above, but encompasses any path diversity systems to be devised in the future.

First Embodiment

FIG. 1 shows a configuration of a wireless transmission system according to a first embodiment of the present invention. Referring to FIG. 1, the wireless transmission system includes a plurality of wireless stations. The present embodiment will be described with respect to a case where the wireless transmission system includes four wireless stations.

When a wireless station receives a non-self-destined packet from another wireless station, the wireless station produces and transmits the same packet as the received non-self-destined packet. Thus, a transmitted packet is transmitted via other wireless stations before arriving at a wireless station being the final recipient (multihop transmission). Note that a "self-destined packet" as used herein refers to a packet received by a wireless station that is addressed to that wireless station, and a "non-self-destined packet" refers to a packet received by a wireless station that is not addressed to that wireless station.

Moreover, the present embodiment will be described with respect to a case where the wireless stations use the PSK-VP scheme for communication. It will be assumed herein that the signal propagation time length between the wireless stations is sufficiently smaller than the delay resolution with which a path diversity effect can be obtained, and is negligible.

In the present invention, in order to distinguish the wireless stations from one another, a wireless station that first transmits a packet will be referred to as a transmitting station 11, and a wireless station being the final recipient of the packet transmitted by the transmitting station 11 will be referred to as a receiving station 13. A packet transmitted by the transmitting station 11 is relayed by other wireless communication stations located within the communication area of the transmitting station 11 before reaching the receiving station 13. Those wireless stations that relay the packet transmitted by the transmitting station 11 will be referred to herein as relay stations 12-2 and 12-1.

Note that while there are two relay stations in the wireless transmission system shown in FIG. 1, there may be three or more relay stations. Where the relay stations 12-1 and 12-2 do not need to be distinguished from one another, they will be referred to as relay stations 12. Moreover, where the transmitting station 11, the relay stations 12 and the receiving station 13 do not need to be distinguished from one another, they will be referred to as wireless stations.

When the relay stations 12-1 and 12-2 receive the packet transmitted by the transmitting station 11, the relay stations 12-1 and 12-2 transmit the received packet after giving the packet a predetermined delay amount based on a reference timing. The reference timing as used herein refers to a timing based on which the relay station 12 transmits a packet. In the following description, the reference timing is when a predetermined wait time passes since a time when a packet is received completely. Note that the term "timing" as used herein may refer to "a point in time".

The relay station 12 gives a predetermined delay amount to a packet when transmitting the packet. The relay station 12 stores in advance a plurality of candidate values of the delay amount to be given to a packet. When the relay station 12 transmits a packet, the relay station 12 randomly selects a delay amount from among a plurality of candidate values. Then, the relay station 12 transmits the packet after waiting the selected delay amount with respect to the reference timing. Herein, the timing obtained by delaying the reference timing by the delay amount, i.e., the timing at which the relay station 12 starts the packet transmission, will be referred to as a transmission start timing.

Figure 2:
FIG. 2 shows a structure of a packet transmitted by a wireless station shown in FIG. 1.

FIG. 2 shows a structure of a packet transmitted by a wireless station shown in FIG. 1. Referring to FIG. 2, a packet includes a preamble (PR), a unique word (UW), a sender address, a recipient address, information data, and a CRC.

The preamble is used for purposes such as gain control, clock recovery, and frequency control. The unique word is used for frame type determination and frame synchronization. The sender address is the address of a wireless station which is the sender of the packet (transmitting station). The recipient address is the address of a wireless station which is the recipient of the packet (receiving station). The information data is the content of the data to be transmitted from the transmitting station 11 to the receiving station 13. The CRC is a CRC (cyclic redundancy check) code used for error detection.

Figure 3:
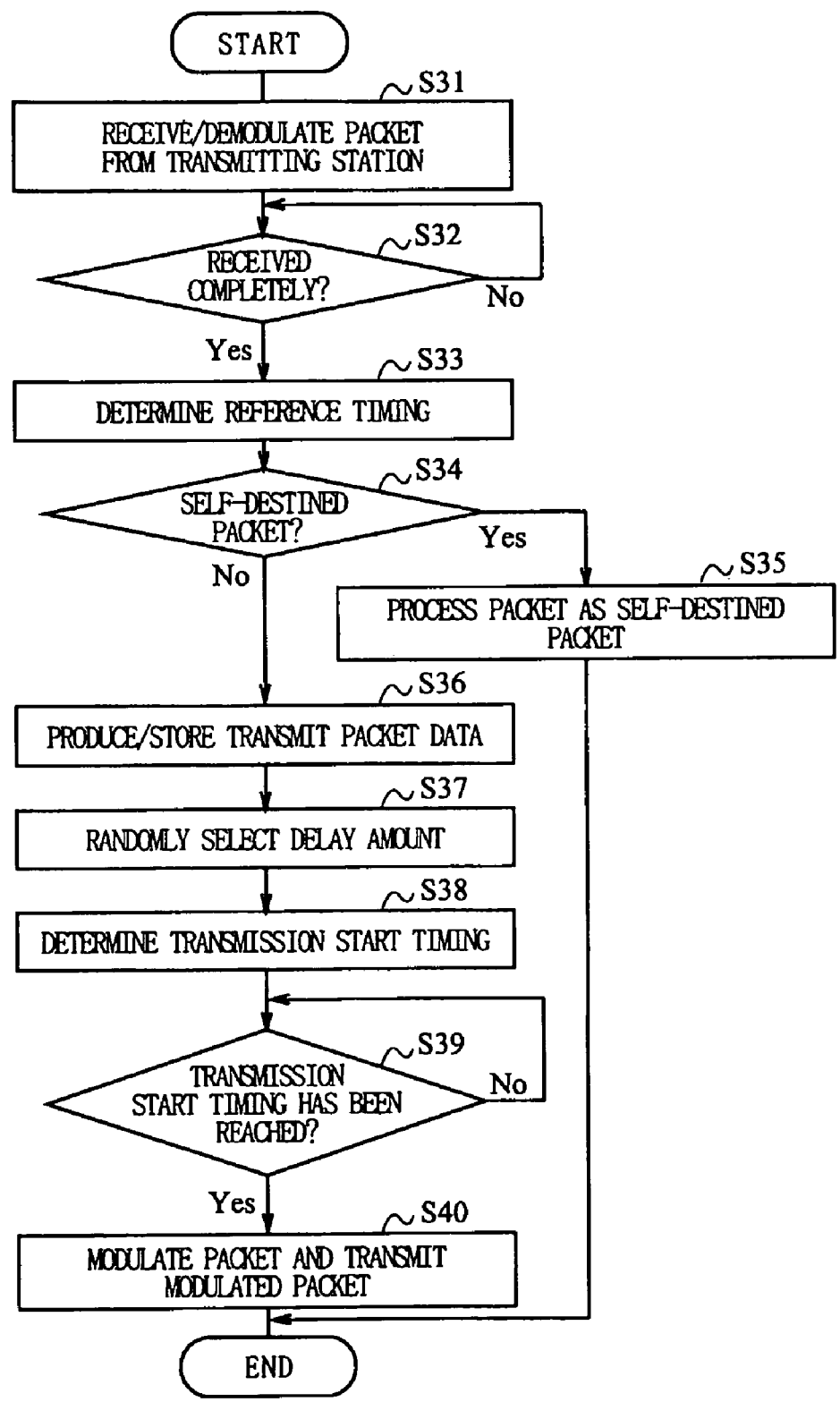
FIG. 3 is a flow chart showing an operation of a relay station 12.

FIG. 3 is a flow chart showing an operation of the relay station 12. First, when the relay station 12 receives a packet transmitted from the transmitting station 11, the relay station 12 demodulates the packet (step S31). The relay station 12 performs a CRC operation on the demodulated packet to confirm a normal reception of the packet. Then, when the packet transmitted from the transmitting station 11 is received completely (Yes in step S32), the relay station 12 determines the reference timing (step S33). Specifically, the relay station 12 determines the reference timing to be when a predetermined amount of time passes since a time when the packet transmitted from the transmitting station 11 is received completely.

Then, the relay station 12 determines whether or not the demodulated packet is a self-destined packet (step S34). If the demodulated packet is a self-destined packet, the relay station 12 processes the packet as being a self-destined packet (step S35).

If the demodulated packet is a non-self-destined packet, the relay station 12 produces the same packet as the packet received from the transmitting station 11, and stores the produced packet (step S36). Then, the relay station 12 randomly selects a delay amount from among delay amount candidate values (step S37).

Then, the relay station 12 determines the transmission start timing (step S38). Then, if the transmission start timing has been reached (Yes in step S39), the relay station 12 modulates the packet stored in step S36 and transmits the modulated packet (step S40).

Figure 4:
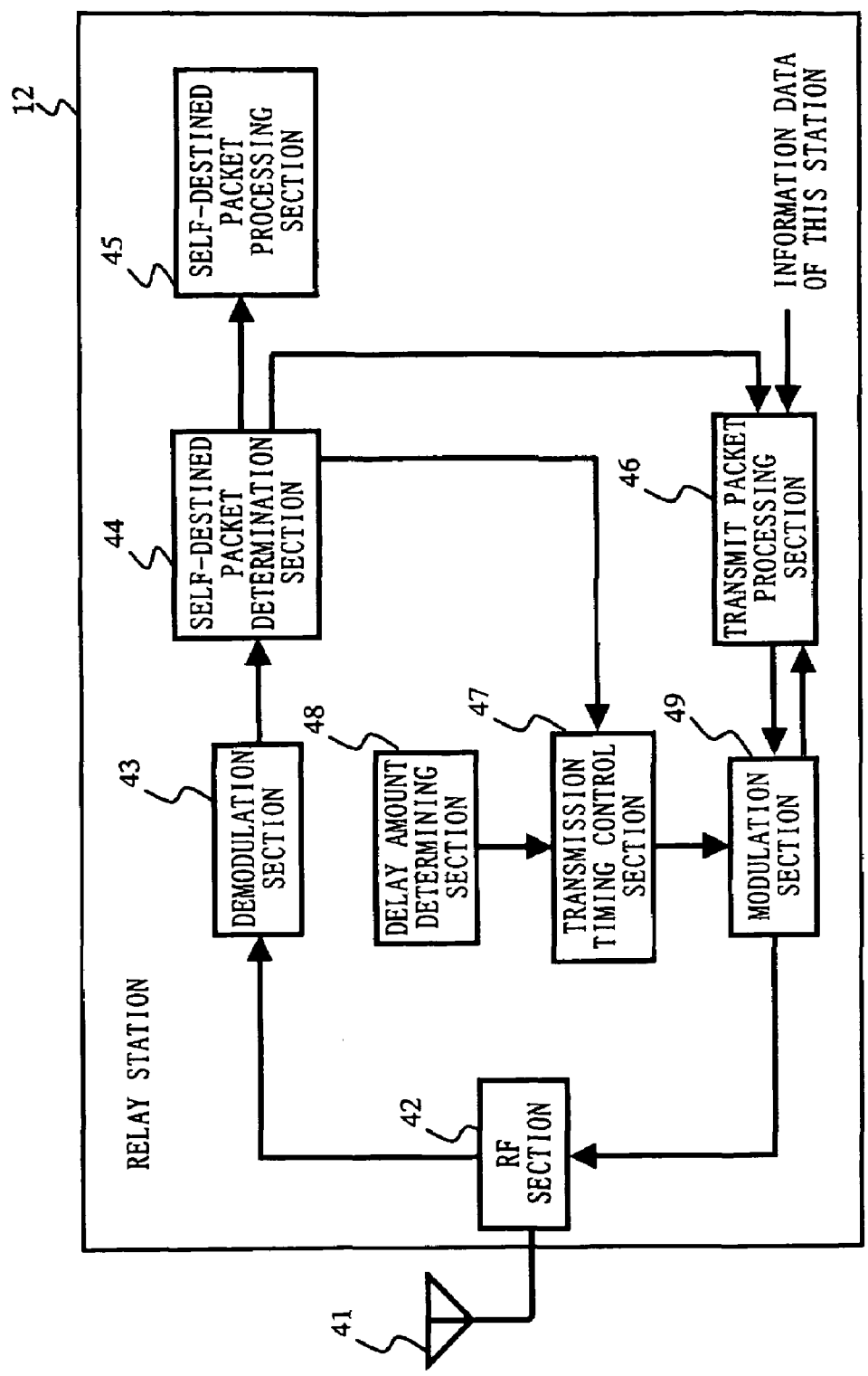
FIG. 4 is a block diagram showing a configuration of the relay station 12.

FIG. 4 is a block diagram showing a configuration of the relay station 12. Referring to FIG. 4, the relay station 12 includes an antenna 41, an RF section 42, a demodulation section 43, a self-destined packet determination section 44, a self-destined packet processing section 45, a transmit packet processing section 46, a transmission timing control section 47, a delay amount determining section 48, and a modulation section 49. Note that the transmitting station 11 and the receiving station 13 are similar in configuration to the relay station 12.

The RF section 42 performs a frequency conversion on the RF (Radio Frequency)-band signal received by the antenna 41 into a baseband signal, and outputs the converted signal as a receive baseband signal. Moreover, the RF section 42 performs a frequency conversion on the modulation baseband signal outputted from the modulation section 49 into an RF-band signal, and transmits the converted signal from the antenna 41. Note that the operation of the RF section 42 corresponds to steps S31 and S40 of FIG. 3.

The demodulation section 43 demodulates the receive baseband signal into digital data, and outputs it as demodulated data. Note that the operation of the demodulation section 43 corresponds to step S31 of FIG. 3.

The self-destined packet determination section 44 determines that a packet has been received when a unique word is detected from the demodulated data outputted from the demodulation section 43. Then, the self-destined packet determination section 44 determines whether or not the packet is a self-destined packet. The self-destined packet determination section 44 passes the data of a packet that is determined to be a self-destined packet to the self-destined packet processing section 45. The self-destined packet determination section 44 passes the data of a packet that is determined to be a non-self-destined packet to the transmit packet processing section 46. Moreover, the self-destined packet determination section 44 performs a CRC operation on the received packet. If there is no error in the packet, the self-destined packet determination section 44 produces a reception completion signal indicating that the packet has been received completely, and passes it to the transmission timing control section 47. Note that the operation of the self-destined packet determination section 44 corresponds to steps S32 and S34 of FIG. 3.

The self-destined packet processing section 45 processes the self-destined packet received from the self-destined packet determination section 44. Note that the operation of the self-destined packet processing section 45 corresponds to step S35 of FIG. 3.

The transmit packet processing section 46 adds a header (including the preamble and the unique word) to the data of the packet received from the self-destined packet determination section 44 to produce the same packet as the packet transmitted by the transmitting station 11, and stores the produced data as transmit packet data. Note that the operation of the transmit packet processing section 46 corresponds to step S36 of FIG. 3.

The delay amount determining section 48 randomly selects a delay amount from among delay amount candidate values. Then, the delay amount determining section 48 produces a delay amount signal indicating the selected delay amount, and passes it to the transmission timing control section 47. Note that the operation of the delay amount determining section 48 corresponds to step S37 of FIG. 3.

The transmission timing control section 47 determines the reference timing based on the reception completion signal received from the self-destined packet determination section 44. Specifically, the transmission timing control section 47 determines the reference timing to be when a predetermined amount of time passes since a time when the reception completion signal is received. Then, the transmission timing control section 47 determines the transmission start timing to be a timing obtained by delaying the reference timing by the delay amount indicated by the delay amount signal received from the delay amount determining section 48. Then, at the transmission start timing, the transmission timing control section 47 produces a transmission start signal instructing the start of a transmission, and passes it to the modulation section 49. Note that the operation of the transmission timing control section 47 corresponds to steps S38 and S39 of FIG. 3.

When the modulation section 49 receives a transmission start signal from the transmission timing control section 47, the modulation section 49 reads out transmit packet data from the transmit packet processing section 46 and modulates the transmit packet data. The baseband signal modulated by the modulation section 49 is subjected to a frequency conversion by the RF section 42, and then transmitted from the antenna 41. Note that the operation of the modulation section 49 corresponds to step S40 of FIG. 3.

Figure 5:
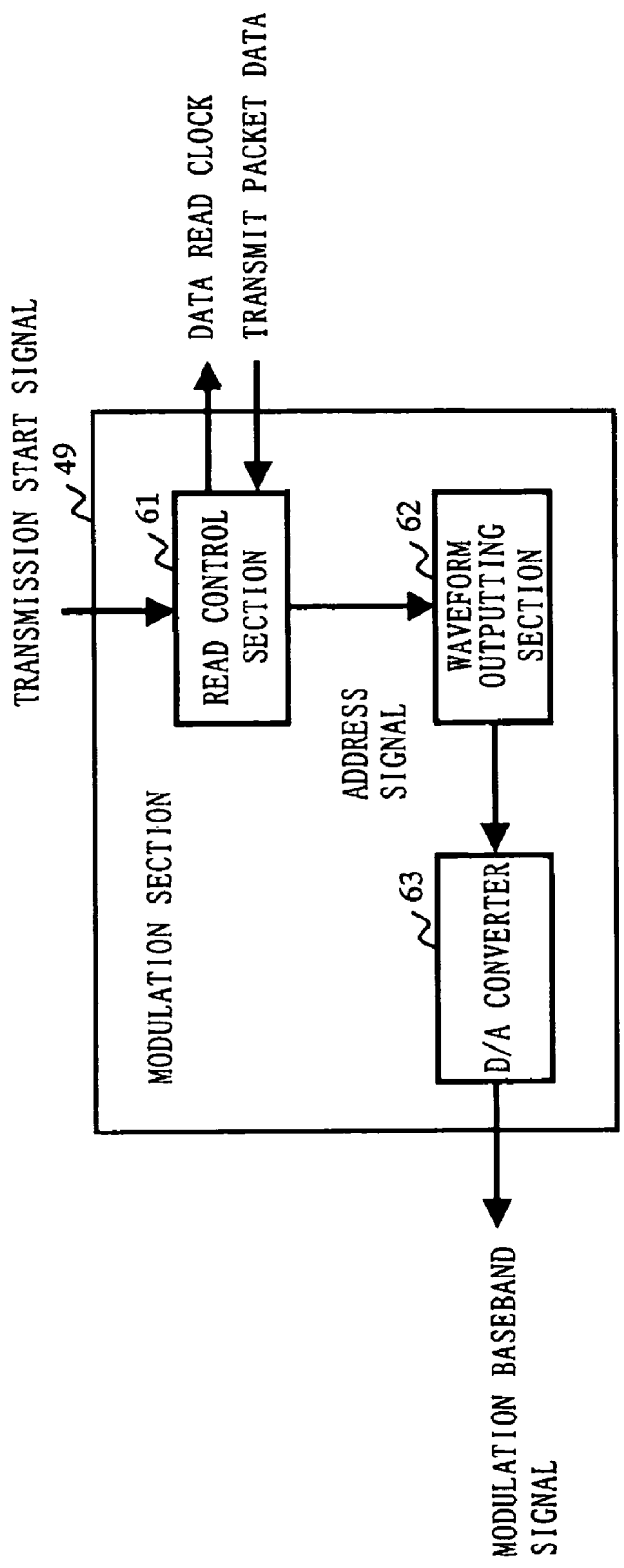
FIG. 5 is a block diagram showing a detailed configuration of a modulation section 49 in a case where the PSK-VP scheme is used for communication.

FIG. 5 is a block diagram showing a detailed configuration of the modulation section 49 in a case where packets are transmitted using the PSK-VP scheme. Referring to FIG. 5, the modulation section 49 includes a read control section 61, a waveform outputting section 62, and a D/A converter 63.

The read control section 61 is formed by a counter that operates based on the base clock. Upon receiving the transmission start signal, the read control section 61 produces, based on the counter value, a data read clock based on which transmit packet data is read out and an address signal indicating an address based on which modulated waveform data is read out. The read control section 61 passes the produced data read clock to the transmit packet processing section 46, and the address signal to the waveform outputting section 62.

The transmit packet processing section 46 is triggered by the received data read clock to read out the transmit packet data, and passes the transmit packet data to the read control section 61 of the modulation section 49.

The waveform outputting section 62 reads out modulation waveform data according to the transmit packet data from a waveform memory (not shown) based on the received address signal. Note that the modulation waveform is stored in advance in the waveform memory.

The D/A converter 63 converts the signal obtained from the waveform outputting section 62 into an analog signal, and outputs the analog signal as the modulation baseband signal.

As described above, after the modulation section 49 receives the transmission start signal, the modulation section 49 produces an address signal for reading out a modulation waveform from the waveform memory. Thus, the timing at which the modulation baseband signal is outputted varies by the unit of base clocks according to the timing at which the transmission start signal is received. Typically, the base clock has a frequency that is several or ten-odd times higher than the symbol frequency (the inverse of the symbol length). Therefore, the timing at which the modulation baseband signal is outputted can be adjusted by the unit of a time period that is several or ten-odd times less than the symbol length.

While FIG. 5 shows a case where the modulation section 49 is used with the PSK-VP scheme, it can be used with the PSK-RZ scheme or the DSK scheme by changing the modulation waveform data stored in the waveform memory.

In order to obtain a path diversity effect at the receiving station 13 by using a modulation/demodulation scheme with an anti-multipath property, the TDOA between the delayed waves needs to be within a predetermined range, i.e., greater than or equal to the delay resolution and less than or equal to the maximum delay. Therefore, the delay amount candidate values that are stored in the relay station 12 and from which a delay amount can be selected by the delay amount determining section 48 need to have a time difference greater than or equal to a predetermined delay resolution, and the difference between the maximum candidate value and the minimum candidate value needs to be less than or equal to a predetermined maximum delay.

Figure 6:
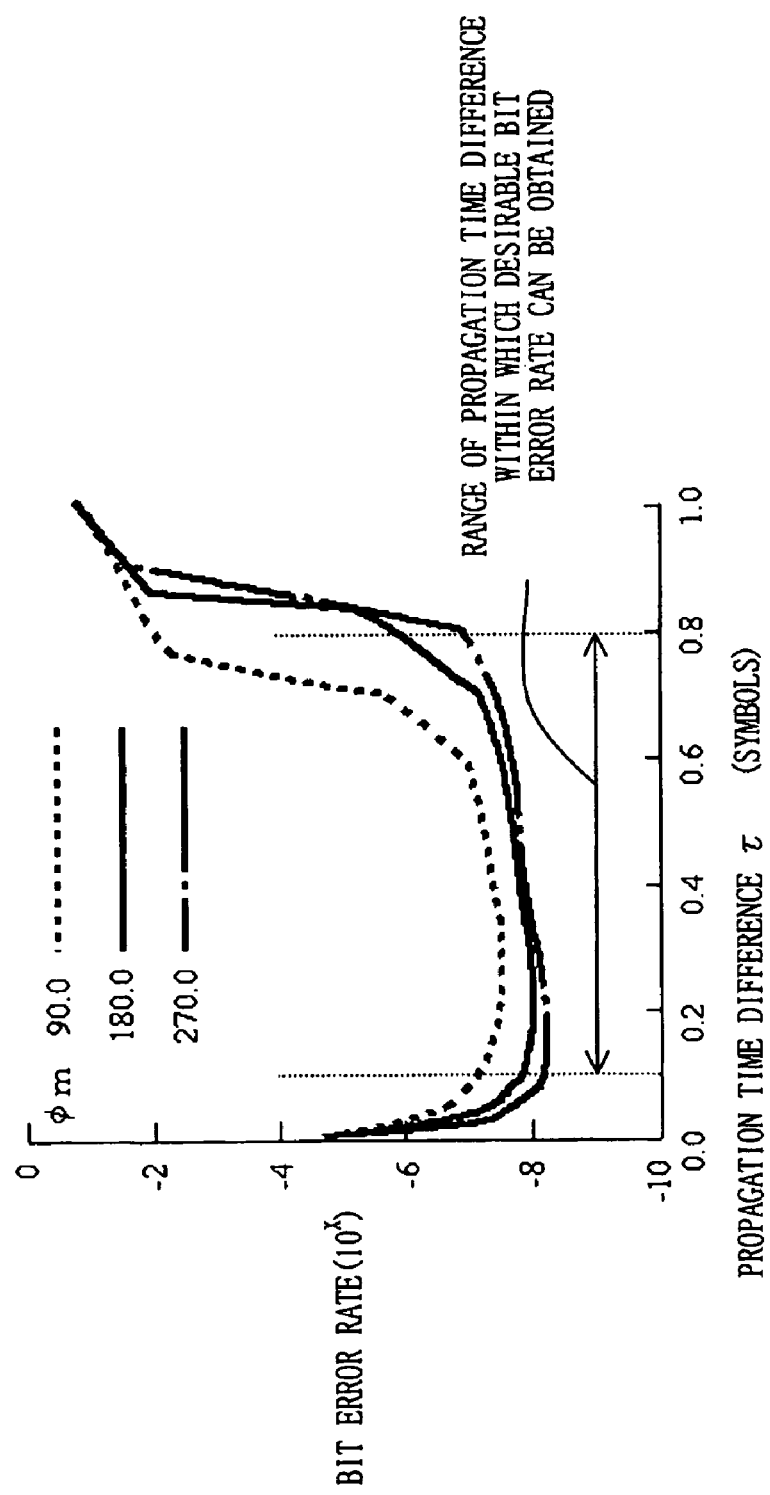
FIG. 6 shows the bit error rate characteristics for the PSK-VP scheme under a 2-ray Rayleigh fading environment.
Figure 9:
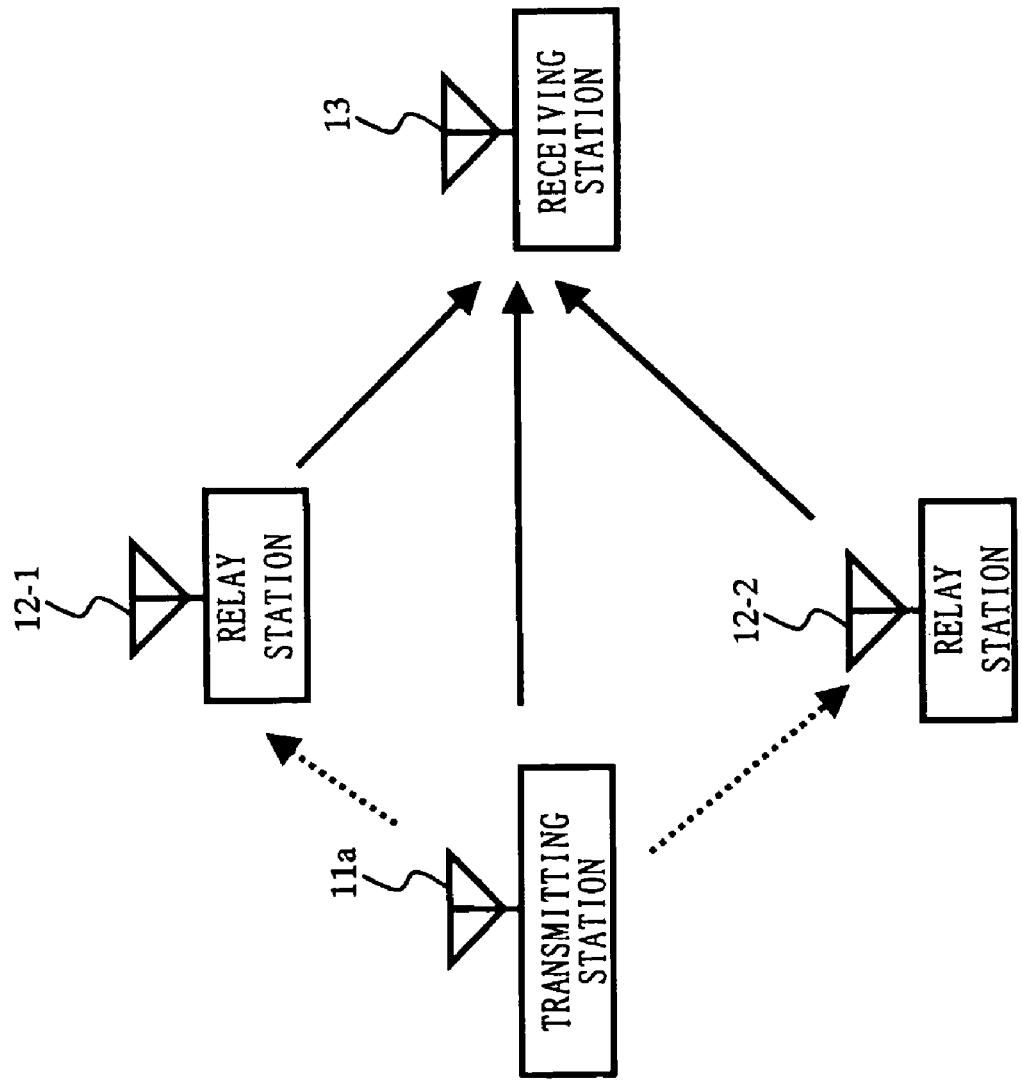
FIG. 9 shows a configuration of a wireless transmission system according to a variation of the first embodiment.

An example of the operation performed by the relay station 12 of the present embodiment will now be described. When the relay station 12 receives a non-self-destined packet, the relay station 12 produces the same packet as the received packet, and transmits the produced packet. The relay station 12 transmits the packet after waiting a delay amount that is randomly selected from among the delay amount candidate values. It is assumed herein that there are two delay amount candidate values of "0" and "T". The delay amount "T" is assumed to be an amount of time corresponding to 0.5 symbol of the PSK-VP scheme, for example, as a TDOA with which a path diversity effect can be obtained.

Where the PSK-VP scheme is used for communication, the maximum delay is less than 1 symbol. While the delay resolution varies depending on the band limitation of the transmit signal, or the like, it is about several times less than the symbol length. FIG. 6 shows the bit error rate characteristics for the PSK-VP scheme under a 2-ray Rayleigh fading environment (FIG. 9 of Non-Patent Document 1). In FIG. 6, the horizontal axis represents the TDOA between two waves, as normalized by the symbol length. The vertical axis represents the bit error rate. φm represents the maximum phase shift amount for the redundancy phase to be added in a symbol. It can be seen from FIG. 6 that in a case where the TDOA is in the range of 0.1 to 0.8 symbol, as compared with a case where the TDOA is zero, desirable bit error rate characteristics can be obtained by selecting an appropriate value for φm. Therefore, in this case, the delay amount candidate values can be determined so that the difference between the candidate values is greater than or equal to 0.1 symbol and that the difference between the maximum candidate value and the minimum candidate value is less than or equal to 0.8 symbol.

If the relay station 12 selects the delay amount "0", the reference timing as it is will be the packet transmission start timing. If the relay station 12 selects the delay amount "T", the packet transmission will start after passage of the delay amount "T" from the reference timing. Thus, if "T" is selected as the delay amount, as opposed to "0", the packet transmission will be delayed by a delay amount of "T".

FIG. 7 shows an example of a packet transmission timing in the present embodiment. FIG. 7 shows a case where the relay station 12-1 selects the delay amount "0", and the relay station 12-2 selects the delay amount "T". Thus, if the relay stations 12-1 and 12-2 select different delay amounts, there is a time difference "T" between timings at which packets are received by the receiving station 13. Since the time difference "T" is greater than or equal to the delay resolution and is less than or equal to the maximum delay, it is possible to obtain a path diversity effect at the receiving station 13.

FIG. 8 shows combinations of delay amounts selected by two relay stations. The relay stations 12-1 and 12-2 each select one of the delay amounts "0" and "T" with a probability of 1/2, there are four different combinations of delay amounts selected by the relay stations 12-1 and 12-2. There are two cases where the relay stations 12-1 and 12-2 select the same delay amount, i.e., where the relay stations 12-1 and 12-2 both select the delay amount "0", and where the relay stations 12-1 and 12-2 both select the delay amount "T". In these cases, packets transmitted by the relay stations 12-1 and 12-2 arrive at the receiving station 13 at the same time, thereby failing to obtain a path diversity effect (see rows 8a and 8d in FIG. 8).

There are two cases where the relay stations 12-1 and 12-2 select different delay amounts, i.e., where the relay station 12-1 selects the delay amount "0" while the relay station 12-2 selects the delay amount "T", and where the relay station 12-1 selects the delay amount "T" while the relay station 12-2 selects the delay amount "0". In these cases, there is a time difference of "T" between the arrivals of packets from the relay stations 12-1 and 12-2 at the receiving station 13, whereby it is possible to obtain a path diversity effect (see rows 8b and 8c in FIG. 8). Thus, where there are two relay stations and the delay amount is selected from among two values, a 2-branch path diversity effect can be obtained with a probability of 2/4=1/2.

In the conventional wireless transmission system, a relay station receiving a packet will always transmit the packet at the same timing. Therefore, if there is only a small propagation time difference between the relay stations with respect to a receiving station, the receiving station cannot separate the received delayed waves from each other, thereby failing to obtain a path diversity effect. Therefore, according to the present embodiment, a relay station receiving a non-self-destined packet transmits the packet while giving the packet a randomly selected delay amount. This makes it less likely that packets arrive at the receiving station at the same time. Therefore, it is possible to increase the possibility that a path diversity effect can be obtained.

Note that in the present embodiment, there are two delay amount candidate values of "0" and "T" stored in wireless stations. The number of delay amount candidate values may alternatively be three or more. Furthermore, if three candidate values of "0", "T/2" and "T" are used, and if the number of relay stations is three or more, it is possible to obtain an up to 3-branch path diversity effect. Thus, it is possible to obtain a greater path diversity effect than when there are two paths.

Moreover, even if there is only a small number of relay stations, it is possible to increase the probability that a path diversity effect can be obtained if the number of delay amount candidate values is increased. If there are two relay stations and there are two delay amount candidate values, the probability that a path diversity effect can be obtained is 1/2, as described above. In contrast, if three delay amount candidate values of "0", "T/2" and "T" are used, there are 32 different combinations of delay amounts selected by the two relay stations. Among these combinations, there are three combinations where all the relay stations select the same delay amount. Therefore, the probability that a path diversity effect cannot be obtained is $3/3^2=1/3$, and the probability that a path diversity effect can be obtained is 2/3. Thus, it is possible to increase the probability that a path diversity effect can be obtained by increasing the number of delay amount candidate values.

(Variation)

A variation of the first embodiment will now be described. In the first embodiment, after the transmitting station first transmits a packet, only the relay stations transmit packets that should be relayed. In contrast, in this variation, when a relay station transmits a packet, the transmitting station also transmits the same packet. Note that the transmitting station of this variation will be referred to as a transmitting station 11a, as distinguished from the transmitting station 11 of the first embodiment.

FIG. 9 shows a configuration of a wireless transmission system according to the variation of the first embodiment. In FIG. 9, dotted-line arrows indicate that packets transmitted by the transmitting station for the first time are received by the relay stations 12-1 and 12-2. Solid-line arrows indicate that the relay stations 12-1 and 12-2 transmit the packet, and also the transmitting station 11a re-transmits the packet. In other words, the transmitting station 11a transmits the same packet twice: first in the first transmission, and then in the second transmission when the transmitting station 11a re-transmits the packet when the relay stations 12-1 and 12-2 transmit the packet.

The transmitting station 11a calculates the reference timing based on which to re-transmit the packet after the first packet transmission. The reference timing can be obtained by adding the propagation time length to the relay station 12 and a predetermined wait time to the timing of the first packet transmission. In this example, it is assumed that the propagation time length between the transmitting station 11a and the relay station 12 is negligible. Therefore, the transmitting station 11a determines the reference timing to be when a predetermined wait time passes since the first packet transmission. Note that the predetermined wait time is equal to the predetermined amount of time based on which a relay station determines the reference timing.

Figure 10:
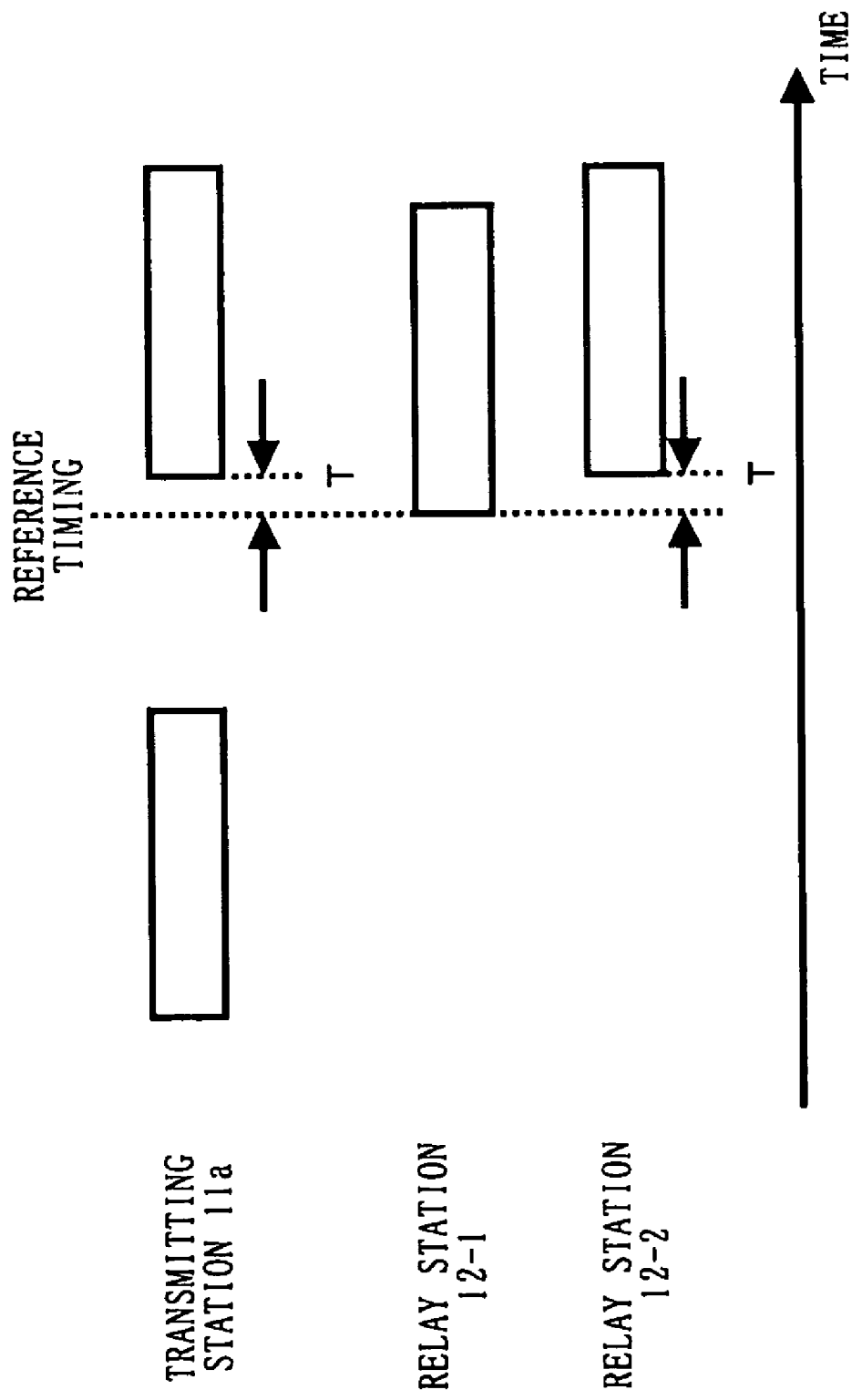
FIG. 10 shows an example of a packet transmission timing according to the variation of the first embodiment.

FIG. 10 shows an example of a packet transmission timing according to this variation. It is assumed that there are two delay amount candidate values of "0" and "T" stored in the relay station 12.

When the transmitting station 11a re-transmits a packet, the transmitting station 11a randomly selects a delay amount from among a plurality of delay amount candidate values, as does a relay station. Then, the transmitting station 11a gives the selected delay amount to the packet to be re-transmitted, and then transmits the packet.

In FIG. 10, the transmitting station 11a selects the delay amount "T", the relay station 12-1 selects the delay amount "0", and the relay station 12-2 selects the delay amount "T". Thus, there are $2^3$ different combinations of delay amounts randomly selected by three wireless stations, each selected from among two delay amounts. Among these combinations, there are two combinations where all three wireless stations select the same delay amount. Therefore, the probability that a path diversity effect cannot be obtained (the probability that the same delay amount is given to a packet at all the stations) is $2/2^3=1/4$, and the probability that a path diversity effect can be obtained is 3/4.

As described above, according to this variation, when the relay stations transmit the packet received from the transmitting station, the transmitting station re-transmits the same packet. This increases the number of wireless stations transmitting the same packet, whereby it is possible to reduce the possibility that packets arrive at the receiving station at the same time. Therefore, it is possible to obtain a path diversity effect with a higher probability.

Second Embodiment

A second embodiment of the present invention will now be described. In the variation of the first embodiment, the transmitting station transmits a packet twice. In the present embodiment, when the transmitting station transmits a packet for the second time, the transmitting station selects a delay amount that is different from the delay amount candidate values stored in the relay stations.

The configuration of the wireless transmission system of the second embodiment is similar to that of the variation of the first embodiment (see FIG. 9). Moreover, the operations of the relay station 12 and the receiving station 13 are similar to those of the first embodiment, and will not be further described below. The transmitting station 11 determines a re-transmission start timing to be a timing obtained by adding a selected delay amount to the reference timing after the first packet transmission, and re-transmits the packet at the re-transmission start timing. At this time, the transmitting station 11 transmits the packet while waiting a delay amount that is different from the delay amounts that can be selected by the relay stations.

It is assumed herein that there are two delay amount candidate values of "0" and "T" stored in the relay station 12. In the second packet transmission, the transmitting station 11 transmits the packet while giving a delay amount other than the delay amount candidate values stored in the relay station 12, i.e., a delay amount that is not equal to "0" or "T". Note that as in the first embodiment, the difference between the delay amount candidate values ("0", "T" and "T/2") is less than or equal to the delay resolution, and the difference between the maximum candidate value and the minimum candidate value is less than or equal to the maximum delay.

Figure 11:
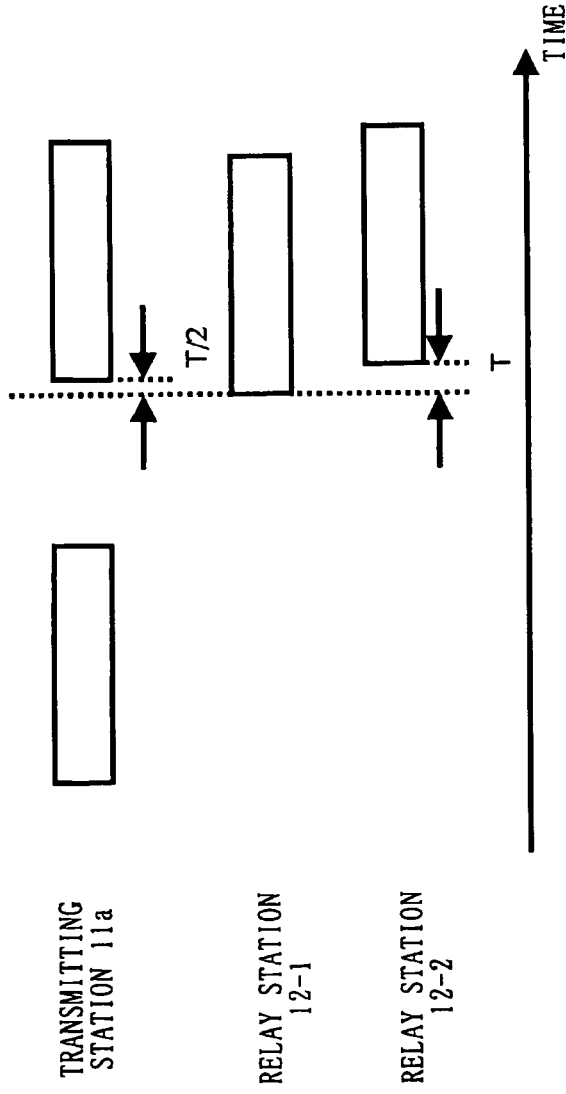
FIG. 11 shows an example of a packet transmission timing according to a second embodiment of the present invention.

FIG. 11 shows an example of a packet transmission timing of the second embodiment. In FIG. 11, the relay station 12-1 selects the delay amount "0", and the relay station 12-2 selects the delay amount "T". The transmitting station 11 selects a delay amount other than "0" and "T", e.g., "T/2". The delay amount selected by the transmitting station 11 may be a predetermined fixed value, or may be determined by the transmitting station 11 each time a packet is re-transmitted.

Therefore, even if the relay stations 12-1 and 12-2 select the same delay amount, the transmitting station 11 always re-transmit the packet with a different delay amount from those selected by the relay stations 12, whereby it is possible to reliably obtain a 2-branch path diversity effect. If the relay stations 12-1 and 12-2 select different delay amounts as shown in FIG. 11, a 3-branch path diversity effect can be obtained at the receiving station 13.

As described above, according to the present embodiment, after the transmitting station transmits a packet for the first time, relay stations receive and transmit the packet, and the transmitting station re-transmits the packet while giving the packet a delay amount different from those given by the relay stations. Thus, it is possible to reliably obtain a 2-branch path diversity effect.

Note that while two delay amount candidate values of "0" and "T" are stored in the relay stations, different candidate values may be used. For example, two delay amount candidate values of "T/2" and "T" may be stored in the relay stations, with the transmitting station always selecting the delay amount "0".

Third Embodiment

A third embodiment of the present invention will now be described. In the present embodiment, each relay station determines whether or not to estimate the delay amount that another relay station has given to the packet.

The configuration of the wireless transmission system of the third embodiment is similar to that of the first embodiment (see FIG. 1). Moreover, the operations of the transmitting station 11 and the receiving station 13 are similar to those of the first embodiment, and will not be further described below. Note that a relay station of the present embodiment will be referred to as a relay station 12a, as distinguished from the relay station 12 of the first embodiment.

The relay station 12a randomly determines whether or not to estimate the delay amount that another relay station (hereinafter referred to as the "other station") has given to the packet. A packet to be produced differs depending on the choice of whether or not to estimate the delay amount that the other station has selected.

Figure 12A:
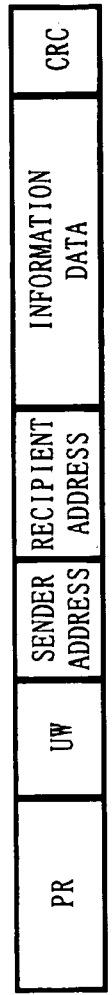
FIG. 12A shows an example of the structure of a packet produced by a relay station 12a according to a third embodiment of the present invention.
Figure 12B:
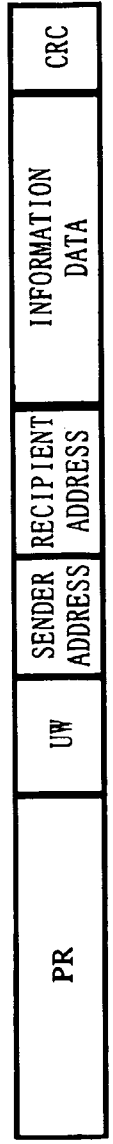
FIG. 12B shows an example of the structure of a packet produced by the relay station 12a according to the third embodiment of the present invention.

FIG. 12A and FIG. 12B each show an example of the structure of a packet produced by the relay station 12a according to the third embodiment of the present invention. FIG. 12A shows the structure of a packet produced by the relay station 12a that is estimating the delay amount selected by the other station. FIG. 12B shows the structure of a packet produced by the relay station 12a that is not estimating the delay amount selected by the other station.

Two different packets shown in FIG. 12A and FIG. 12B have different preamble lengths. The preamble of the packet shown in FIG. 12B is longer than that of the packet shown in FIG. 12A. Otherwise, the packet is similar to that used in the first embodiment (FIG. 2), and will not be further described below.

When the relay station 12a that has determined to estimate the delay amount of the other station transmits a packet, the relay station 12a produces a packet as shown in FIG. 12A. The relay station that has determined not to estimate the delay amount of the other station produces a packet as shown in FIG. 12B.

Figure 13:
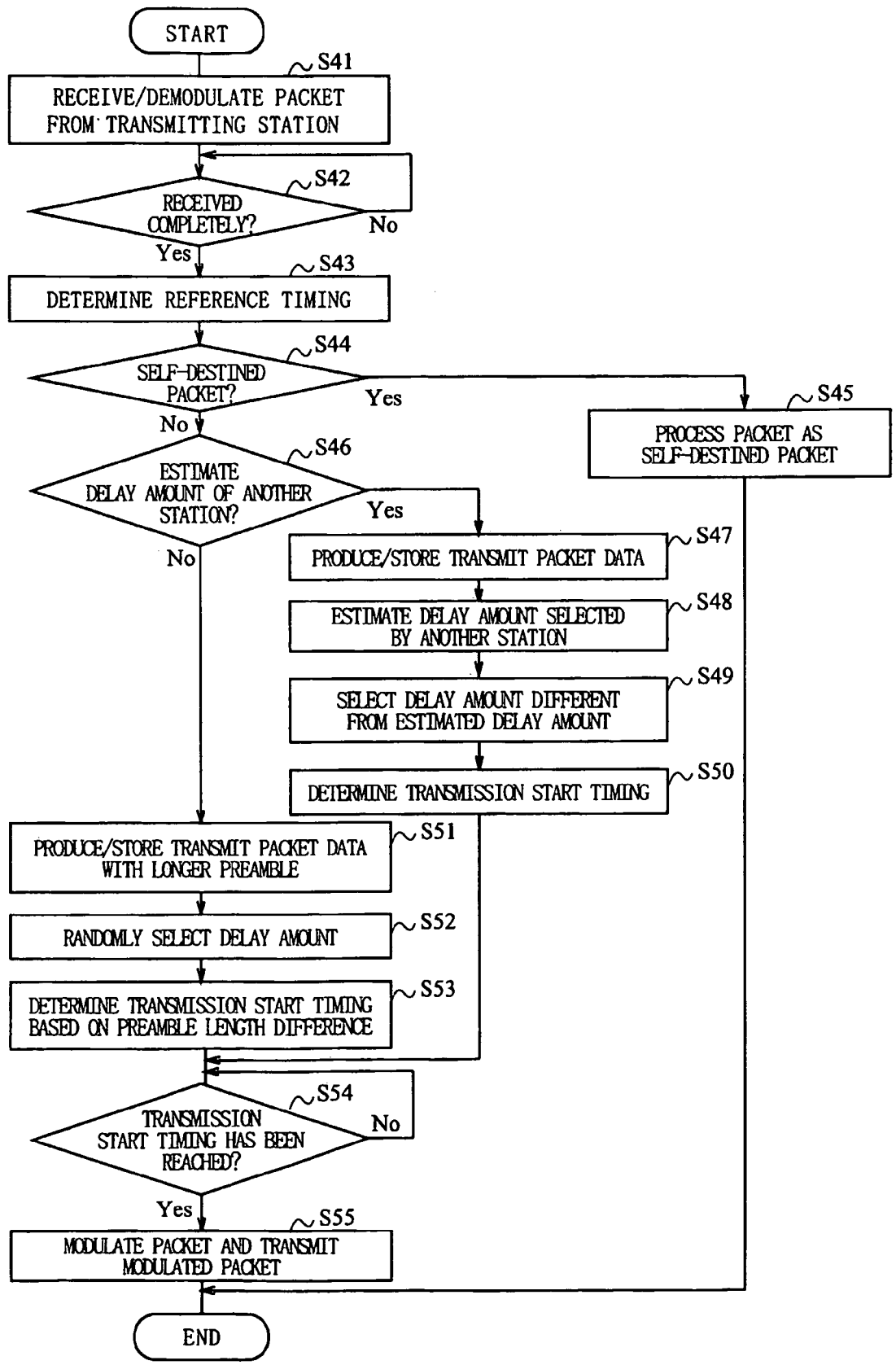

FIG. 13 is a flowchart showing an operation of the relay station 12a. In FIG. 13, the operation of steps S41 to S45 is similar to that of steps S31 to S35 of the flow chart shown in FIG. 3, and will not be further described below.

In step S44, if the received packet is a non-self-destined packet, the relay station 12a randomly determines whether or not to estimate the delay amount of the other station (step S46). If the relay station 12a has determined not to estimate the delay amount of the other station, the relay station 12a produces and stores a packet with a longer preamble as shown in FIG. 12B (step S51). Then, the relay station 12a randomly selects a delay amount from among delay amount candidate values (step S52).

Then, the relay station 12a determines the transmission start timing based on the difference between the preamble lengths (step S53). The relay station 12a determines the transmission start timing to be the reference timing plus the delay amount minus the amount of time corresponding to the difference between the preamble length of the packet produced by a relay station estimating the delay amount of the other station and that of the packet produced by relay station 12a. When the transmission start timing has been reached (Yes in step S54), the relay station 12a modulates the packet and transmits the modulated packet (step S55).

If the relay station 12a determines in step S46 to estimate the delay amount of the other station, the relay station 12a produces and stores a packet with a normal preamble length as shown in FIG. 12A (step S47). Then, the relay station 12a receives the preamble of the packet transmitted by the other station to estimate the delay amount that the other station has given to the packet (step S48). Then, the relay station 12a selects a delay amount from among the candidate values that is different from the estimated delay amount (step S49).

Then, the relay station 12a determines the transmission start timing (step S50). The relay station 12a determines the transmission start timing to be a timing obtained by giving the delay amount to the reference timing. When the transmission start timing has been reached (Yes in step S54), the relay station 12a modulates the packet and transmits the modulated packet (step S55).

Figure 14:
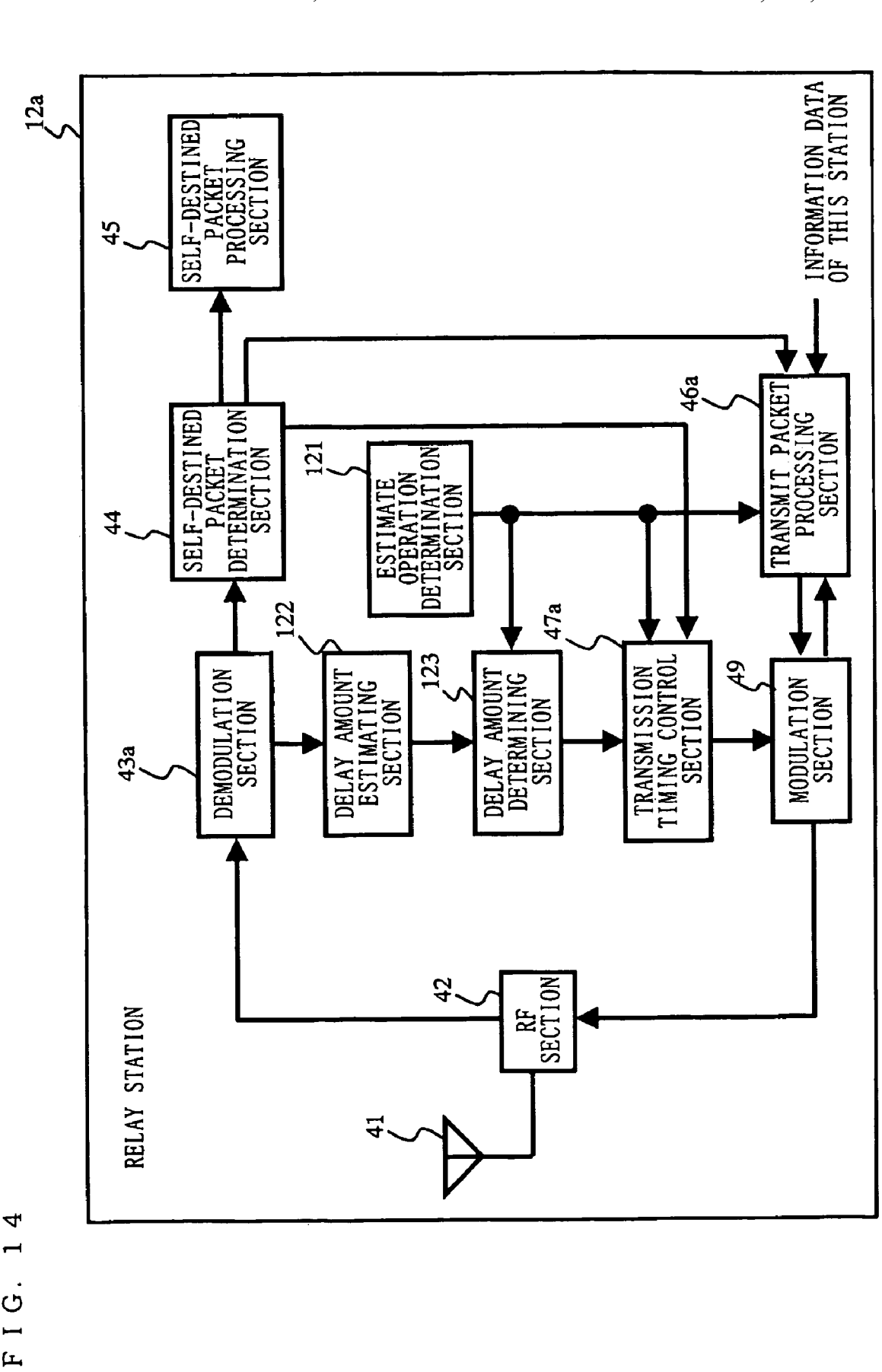

FIG. 14 is a block diagram showing a configuration of the relay station 12a. The relay station 12a shown in FIG. 14 differs from the relay station of the first embodiment shown in FIG. 4 in that the relay station 12a further includes an estimate operation determination section 121 and a delay amount estimating section 122. In FIG. 14, like components to those shown in FIG. 4 will be denoted by like reference numerals, and will not be further described below.

The estimate operation determination section 121 randomly selects whether or not to estimate the delay amount selected by the other station. Then, the estimate operation determination section 121 produces an estimate operation instruction signal indicating whether or not to estimate the delay amount selected by the other station, and passes it to a transmit packet processing section 46a and a delay amount determining section 123. Note that the operation of the estimate operation determination section 121 corresponds to step S46 of FIG. 13.

First, the operation of an important part of the relay station 12a will be described, with respect to a case where it is determined in the estimate operation determination section 121 that the delay amount of the other station is not to be estimated. When an estimate operation instruction signal indicating that the delay amount selected by the other station is not to be estimated is received, the transmit packet processing section 46a produces and stores a packet based on the packet that has been determined by the self-destined packet determination section 44 to be a non-self-destined packet. Then, the packet produced by the transmit packet processing section 46a is a packet with a longer preamble as shown in FIG. 12B. Note that the operation of the transmit packet processing section 46a in this case corresponds to step S51 of FIG. 13.

When an estimate operation instruction signal indicating that the delay amount selected by the other station is not to be estimated is received, the delay amount determining section 123 randomly selects a delay amount from among the delay amount candidate values. Then, the delay amount determining section 123 produces a delay amount signal indicating the selected delay amount, and passes it to the transmission timing control section 47a. Note that the operation of the delay amount determining section 123 in this case corresponds to step S52 of FIG. 13.

The transmission timing control section 47a determines the reference timing based on the reception completion signal received from the self-destined packet determination section 44. Then, the transmission timing control section 47 starts the transmission earlier, by the difference between the preamble length of the packet shown in FIG. 12B and that of the packet shown in FIG. 12A, than the reference timing delayed by the delay amount indicated by the delay amount signal received from the delay amount determining section 123. Then, when the transmission start timing is reached, the transmission timing control section 47 produces a transmission start signal, and passes it to the modulation section 49. Note that the operation of the transmission timing control section 47a in this case corresponds to steps S53 and S54 of FIG. 13.

Next, the operation where it is determined in the estimate operation determination section 121 that the delay amount of the other station is to be estimated will be described. If the estimate operation instruction signal produced by the estimate operation determination section 121 indicates that the delay amount selected by the other station is to be estimated, the transmit packet processing section 46a produces and stores a packet based on the packet that has been determined by the self-destined packet determination section 44 to be a non-self-destined packet. The packet produced by the transmit packet processing section 46a is a packet with a normal preamble length as shown in FIG. 12A. Note that the operation of the transmit packet processing section 46a in this case corresponds to step S47 of FIG. 13.

A demodulation section 43a demodulates the received packet and outputs it as demodulated data. Moreover, the demodulation section 43a produces a symbol timing signal by recovering the symbol timing based on the received packet, and passes it to the delay amount estimating section 122. Note that the operation of the demodulation section 43a corresponds to step S41 of FIG. 13.

The delay amount estimating section 122 estimates the delay amount of the other station based on the received symbol timing signal. The details of this operation will be described later. Then, the delay amount estimating section 122 produces an estimation result signal indicating the estimated delay amount, and passes it to the delay amount determining section 123. Note that the operation of the delay amount estimating section 122 corresponds to step S48 of FIG. 13.

The delay amount determining section 123 selects a delay amount, from among the delay amount candidate values, that is different from the delay amount indicated by the received estimation result signal. Then, the delay amount determining section 123 produces a delay amount signal indicating the selected delay amount, and passes it to the transmission timing control section 47a. Note that the operation of the delay amount determining section 123 in this case corresponds to step S49 of FIG. 13.

The transmission timing control section 47*a* determines the reference timing based on the received reception completion signal. Then, the transmission timing control section 47 determines the transmission start timing to be a timing obtained by delaying the reference timing by the delay amount indicated by the delay amount signal. At the transmission start timing, the transmission timing control section 47 produces a transmission start signal instructing the start of a transmission, and passes it to the modulation section 49. Note that the operation of the transmission timing control section 47*a* in this case corresponds to steps S50 and S54 of FIG. 13.

FIG. 15 is a block diagram showing a configuration of the demodulation section 43*a* used with the PSK-VP scheme. The demodulation section 43*a* includes a differential detection section 131, a detected wave filter 132, a symbol synchronization section 133, and a data determination section 134.

The differential detection section 131 performs a differential detection operation on the receive baseband signal, and outputs the detected signal to the detected wave filter 132. The detected wave filter 132 passes the detection signal therethrough while removing noise. The signal filtered by the detected wave filter 132 is inputted to the symbol synchronization section 133 and to the data determination section 134.

The symbol synchronization section 133 performs a clock recovery operation based on the input signal to recover the symbol timing. The symbol synchronization section 133 passes the recovered symbol timing to the data determination section 134. The data determination section 134 samples the detection signal according to the received symbol timing to obtain demodulated data.

Next, the operation of the relay stations of the present embodiment will be described with a specific example. The following description is directed to an example where the PSK-VP scheme is used as the packet modulation/demodulation scheme, and two delay amount candidate values of "0" and "T" are stored in the relay stations. Moreover, it is assumed that the delay amount "T" is an amount of time corresponding to 0.5 symbol of the PSK-VP scheme.

FIG. 16 shows an example of a packet transmission timing of the third embodiment. In FIG. 16, each hatched area represents the preamble of a packet. A relay station 12-1*a*, which has determined not to estimate the delay amount of the other station, produces a packet with a longer preamble. A relay station 12-2*a*, which has determined to estimate the delay amount of the other station, produces a packet with a normal preamble length.

The relay station 12-1*a*, which has determined not to estimate the delay amount of the other station, gives a selected delay amount "0" or "T" to the produced packet with a longer preamble, and transmits the packet. It is herein assumed that the delay amount "T" is selected. The packet transmission start timing of the relay station 12-1*a* is a timing obtained by delaying, by the selected delay amount, a timing that is earlier than the reference timing by the preamble length difference. Note that the preamble length difference needs to be sufficient for properly recovering the symbol timing. For example, with a typical clock recovery circuit, some tens of symbols are required.

The relay station 12-2*a*, which has determined to estimate the delay amount of the other station, recovers the symbol timing when receiving the preamble of a packet of the relay station 12-1*a*, which has determined not to estimate the delay amount of the other station. Note that the relay station 12-2*a* has a reference symbol timing recovered in advance. The reference symbol timing may be a symbol timing obtained by receiving a packet from the transmitting station, or a symbol timing in synchronism with the reference timing.

The relay station 12-2*a* estimates the delay amount of the relay station 12-1*a* by comparing the reference symbol timing with a symbol timing that is obtained by a clock recovery operation based on the preamble of the packet transmitted by the relay station 12-1*a*.

FIG. 17 shows examples of symbol timings obtained by a clock recovery operation based on a preamble. As shown in FIG. 17, the symbol timing is a signal whose period is equal to the 1-symbol length.

FIG. 17(*a*) shows the reference symbol timing. FIG. 17(*b*) shows the symbol timing recovered at the relay station 12-2*a* in a case where the delay amount selected by the relay station 12-1*a* is "0". FIG. 17(*c*) shows the symbol timing recovered at the relay station 12-2*a* in a case where the delay amount selected by the relay station 12-1*a* is "T".

Note that while it is assumed herein that the reference symbol timing is equal to the symbol timing recovered at the relay station 12-2*a* when the delay amount selected by the relay station 12-2*a* is "0", these timings may be different from each other.

There will be a delay time difference of T (0.5 symbol) in the symbol timing recovered at the relay station 12-2*a* between when the relay station 12-1*a* selects the delay amount "0" and when the relay station 12-1*a* selects the delay amount "T". Therefore, the relay station 12-2*a* can estimate whether the delay amount selected by the relay station 12-1*a* is "0" or "T" by detecting the delay time difference between the symbol timing obtained by a clock recovery operation based on the preamble and the reference symbol timing.

After estimating the delay amount of the relay station 12-1*a*, the relay station 12-2*a* selects a delay amount different from the estimated delay amount. Then, the relay station 12-2*a* starts the transmission after passage of the selected delay amount since the reference timing. Thus, the unique word and subsequent data of the packet transmitted by the relay station 12-1*a* and those of the packet transmitted by the relay station 12-2*a* will be shifted from each other by the time difference T, as shown in FIG. 16. Thus, it is possible to reliably obtain a 2-branch path diversity effect at the receiving station.

FIG. 18 shows combinations of packets transmitted by relay stations in a case where there are two relay stations in the wireless transmission system. Each of the relay stations 12-1*a* and 12-2*a* determines, with a 1/2 probability, whether or not to estimate the delay amount of the other station. Therefore, there are four different combinations. Moreover, since there are two delay amount candidate values of "0" and "T", if the two relay stations both determine not to estimate the delay amount of the other station, the relay stations each randomly selects the delay amount and transmit a packet with a longer preamble. Therefore, in such a case, it is possible to obtain a path diversity effect with a probability of 1/2 (see row 18*a* in FIG. 18).

If one of the two relay stations determines to estimate the delay amount of the other station while the other determines not to, the two relay stations will give different delay amounts to the packets, whereby it is possible to reliably obtain a path diversity effect (see rows 18*b* and 18*c* in FIG. 18).

If the two relay stations both determine to estimate the delay amount of the other station, the relay stations will each attempt to estimate the delay amount of the other until the start of the packet transmission. However, neither relay station has transmitted a packet with a longer preamble length, whereby the delay amount will be estimated erroneously. Then, assuming that the two relay stations randomly select the delay amounts, it is possible to obtain a path diversity effect with a probability of 1/2 (see row 18d in FIG. 18).

Thus, in the present embodiment, the probability that a path diversity effect can be obtained can be calculated as 1/4*1/2+1/4+1/4*1/2=3/4. In the first embodiment, where there are two relay stations and there are two delay amount candidate values, the probability that a path diversity effect can be obtained is 1/2. Thus, by randomly determining whether or not to estimate the delay amount of the other station as in the present embodiment, it is possible to increase the probability that a path diversity effect can be obtained, as compared with the first embodiment.

Note that while the present embodiment has been described with respect to a system where only relay stations transmit packets transmitted from the transmitting station, the transmitting station may alternatively transmit a packet twice as in the variation of the first embodiment.

Figure 19:
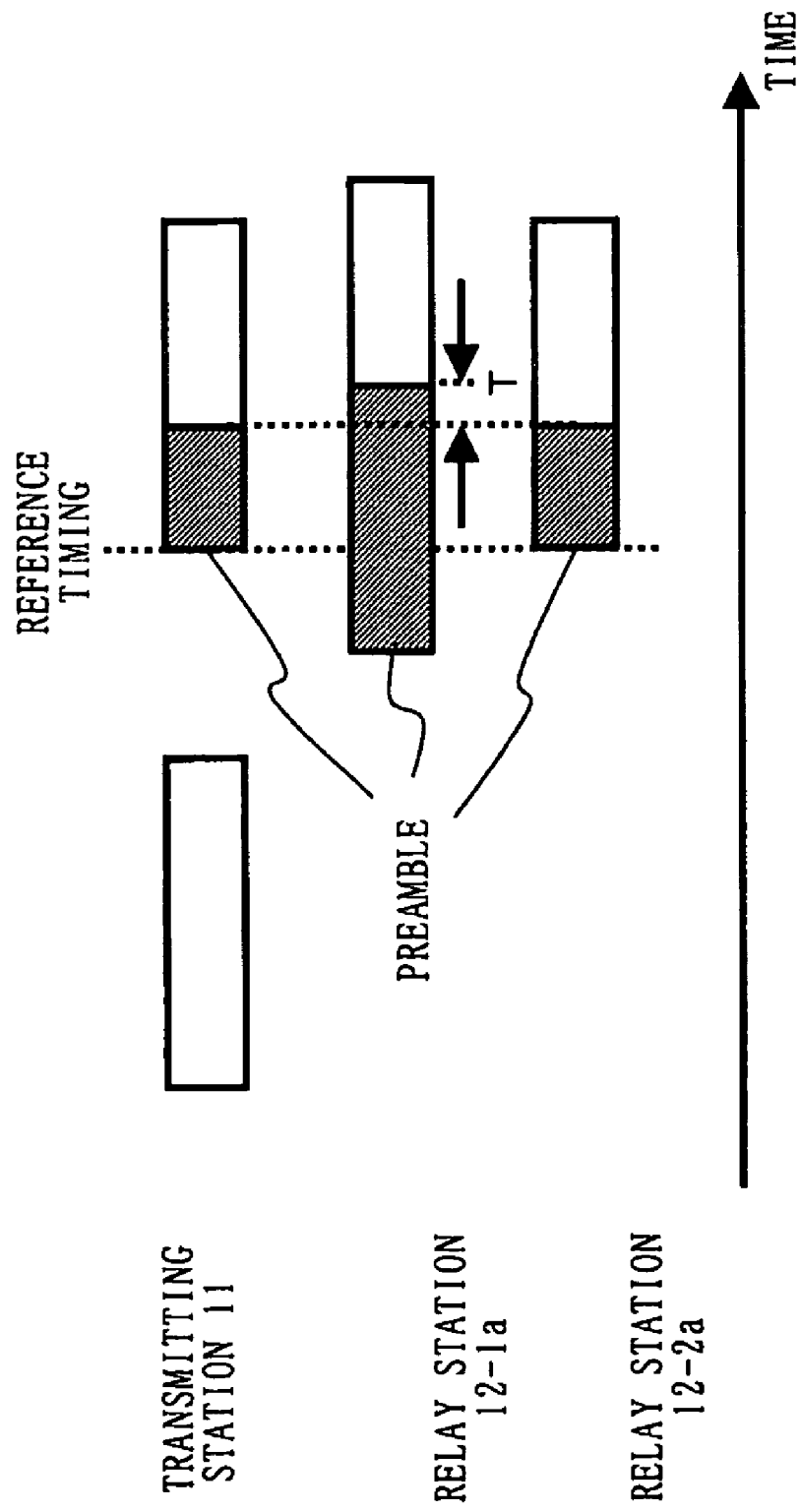
FIG. 19 shows an example of a packet transmission timing according to the third embodiment in a case where the transmitting station re-transmits a packet.

FIG. 19 shows an example of a packet transmission timing in such a case. In FIG. 19, the relay station 12-1a determines not to estimate the delay amount of the other station, while the transmitting station and the relay station 12-2a determine to estimate the delay amount of the other station. The relay station 12-1a selects the delay amount "T".

When the preamble of the packet transmitted by the relay station 12-1a is received, the transmitting station 11 and the relay station 12-2a estimate the delay amount selected by the relay station 12-1a. As a result, the transmitting station 11 and the relay station 12-2a select the delay amount "0" and transmit the packet. Thus, when the relay station transmits the packet received from the transmitting station, the transmitting station re-transmits the same packet, thus increasing the number of wireless stations that transmit the same packet, whereby it is possible to obtain a path diversity effect with a higher probability.

Note that while two delay amount candidate values of "0" and "T" are stored in the relay stations in the present embodiment, the number of candidate values may be three or more. For example, if four candidate values of "0", "T/3", "2T/3" and "T" are used, an up to 4-branch path diversity effect can be obtained even if the number of relay stations increases. Note that also in such a case, it is necessary that the difference between the candidate values is greater than or equal to the delay resolution with which a path diversity effect can be obtained, and the difference between the maximum candidate value and the minimum candidate value is less than or equal to the maximum delay with which a path diversity effect can be obtained. The number of candidate values and relay stations can be freely selected as long as these conditions are satisfied.

Fourth Embodiment

A fourth embodiment of the present invention will now be described. In the third embodiment, a relay station determines whether or not to estimate the delay amount that the other station has given to the packet, but the relay station transmits the packet received from the transmitting station only once. In the present embodiment, the transmitting station transmits the same packet twice.

The configuration of the wireless transmission system of the fourth embodiment is similar to that of the variation of the first embodiment (see FIG. 9). The operation of the receiving station 13 is similar to that of the first embodiment, and will not be further described below.

The operation of the relay station in the present embodiment is similar to that of the relay station 12a of the third embodiment, and will not be further described below. The present embodiment will be described with respect to a case where two delay amount candidate values of "0" and "T" are stored in the relay stations. In the second packet transmission, the transmitting station 11a transmits the packet while giving it a delay amount other than the delay amount candidate values stored in the relay station 12a, i.e., a delay amount that is not equal to "0" or "T".

Figure 20:
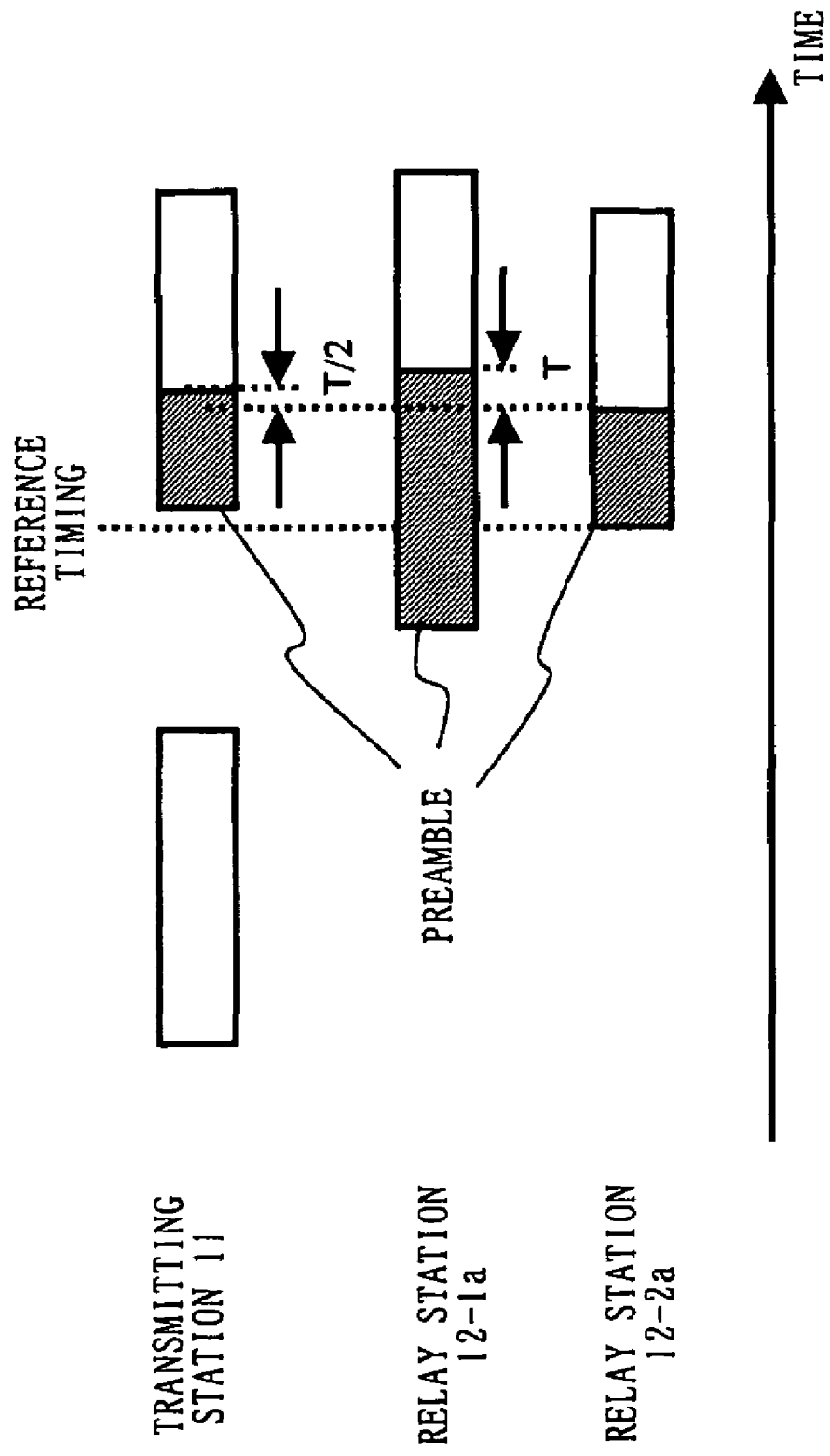
FIG. 20 shows an example of a packet transmission timing according to a fourth embodiment of the present invention.

FIG. 20 shows an example of a packet transmission timing of the fourth embodiment. In FIG. 20, the relay station 12-1a determines not to estimate the delay amount of the other station, and transmits the packet while selecting the delay amount "T". The relay station 12-2a determines to estimate the delay amount of the other station. The relay station 12-2a estimates the delay amount of the relay station 12-1a, and transmits the packet while selecting the delay amount "0", which is different from the estimated delay amount. The transmitting station 11a transmits the packet while selecting a delay amount other than "0" and "T", e.g., "T/2". Thus, the transmitting station selects the delay amount "T/2", the relay station 12-1a selects the delay amount "T", and the relay station 12-2a selects the delay amount "0", whereby a 3-branch path diversity effect can be obtained at the receiving station 13.

As described above, according to the present embodiment, the transmitting station re-transmits the packet while giving it a delay amount that is not equal to the delay amount selected by the relay station. Moreover, a relay station randomly determines whether or not to estimate the delay amount of the other station. Thus, it is possible to increase the probability that a path diversity effect can be obtained. Even if all the relay stations select the same delay amount, the transmitting station uses a delay amount different from that of the relay stations. Therefore, it is possible to reliably obtain a 2-branch path diversity effect and thus to increase the probability that a path diversity effect can be obtained, as compared with the third embodiment.

Note that while two delay amount candidate values of "0" and "T" are stored in the relay stations, different candidate values may be used. For example, two delay amount candidate values of "T/2" and "T" may be stored in the relay stations, with the transmitting station always selecting the delay amount "0".

Note that in the third and fourth embodiments, a symbol timing obtained by a clock recovery operation is used for estimating the delay amount of the other station. The method for estimating the delay amount selected by the other station is not limited to a method that uses the recovered symbol timing. For example, the delay amount selected by the other station may alternatively be estimated by using the reception level. A method for estimating the delay amount selected by the other station by using the reception level will now be described.

This method utilizes the fact that the reception level significantly varies when a relay station receives a packet. A relay station detects the timing of the reception level variation, and detects the phase difference between the timing and the reference symbol timing. Thus, it is possible to estimate the delay amount of the other station.

Figure 21:
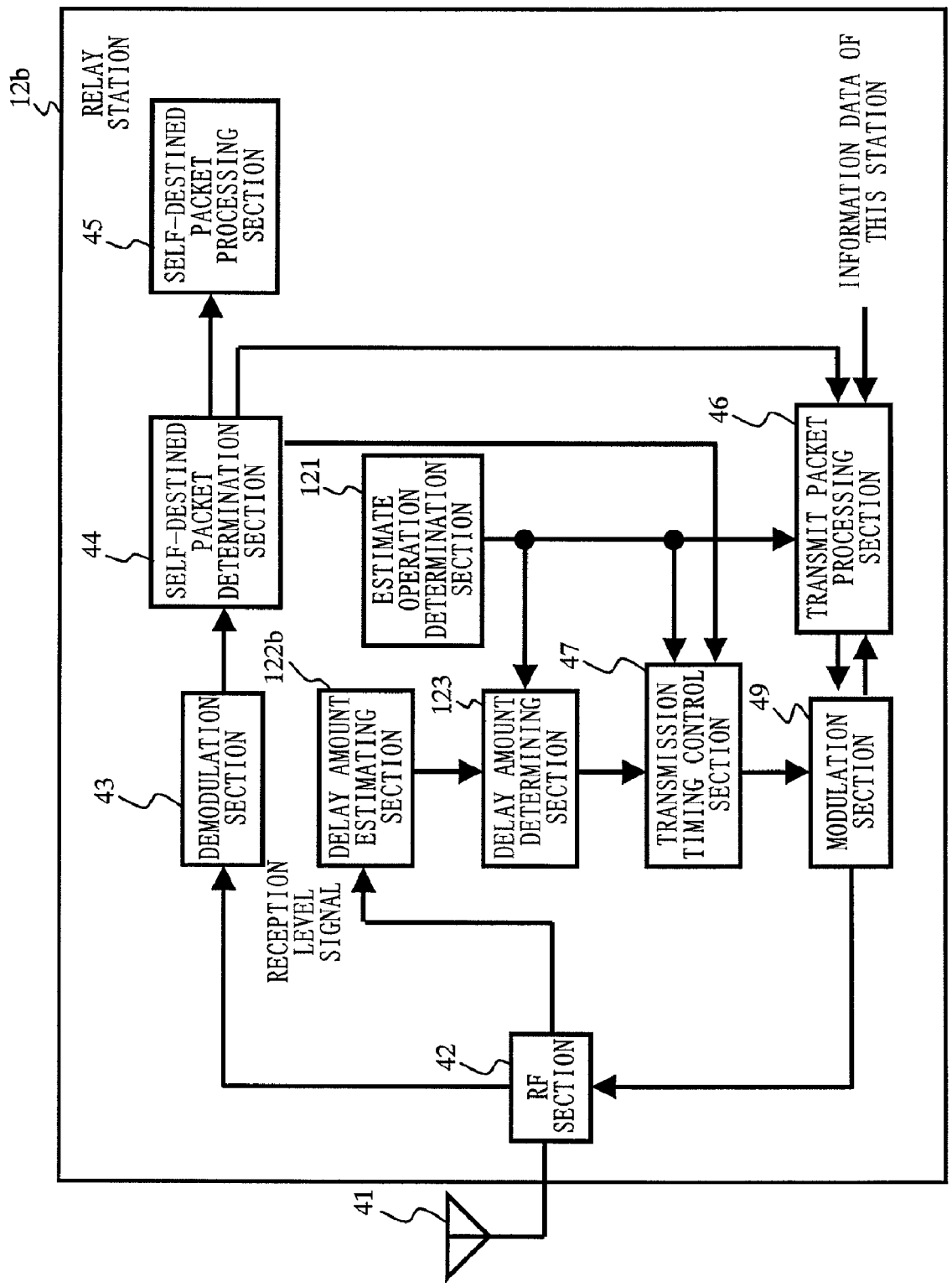
FIG. 21 is a block diagram showing a configuration of a relay station 12b in a case where the delay amount of another station is estimated based on the reception level.

FIG. 21 is a block diagram showing a configuration of a relay station in a case where the delay amount of the other station is estimated based on the reception level. The relay station shown in FIG. 21 will be referred to as a relay station 12b, as distinguished from the relay station of the first to third embodiments. The relay station differs from that shown in FIG. 14 in that a reception level signal indicating the level of a received signal is outputted from the RF section 42 to the delay amount estimating section 122. In FIG. 21, like components to those of the relay station of the third embodiment shown in FIG. 14 will be denoted by like reference numerals, and will not be further described below.

In a relay station 12*b* that has determined to estimate the delay amount of the other station, the RF section 42 detects the reception level of the packet transmitted by a relay station 12*b* that has determined not to estimate the delay amount of the other station. Then, the RF section 42 produces a reception level signal indicating the detected reception level, and passes it to a delay amount estimating section 122*b*.

The delay amount estimating section 122*b* estimates the delay amount of the other station based on the received reception level signal. Specifically, the delay amount estimating section 122*b* detects the phase difference between the reception level signal and the reference symbol timing. It is possible to know which delay amount is selected by the relay station 12*b*, which has determined not to estimate the delay amount of the other station, by detecting the timing of the reception level variation. In this case, it is only necessary to detect the timing of the variation of the reception level at the beginning of a packet. Therefore, as compared with a case where a symbol timing obtained by a clock recovery operation based on the preamble is used, it is possible to shorten the preamble length of the packet shown in FIG. 12B.

Note that the first to fourth embodiments have been described with respect to a case where the number of relay stations is two. The number of relay stations may be three or more, and it is still possible to obtain similar effects to those obtained where the number of relay stations is two.

In the first to fourth embodiments, a wireless station transmits a packet using the PSK-VP scheme. Modulation/demodulation schemes other than the PSK-VP scheme may be used. For example, schemes that can be used include the PSK-RZ scheme, a spread spectrum scheme such as the DSSS scheme, the OFDM scheme, and the DSK (double shift keying) scheme (where the maximum delay is less then 0.5 bit) in which information is carried as the direction of phase shift added to a transmit symbol, thereby exerting an anti-multipath property. Alternatively, an equalizer may be used in the demodulation section. Note that the DSK scheme is described in detail in Non-Patent Document 3.

With any of the modulation/demodulation schemes, the delay amount candidate values can be determined so that the difference between the candidate values is greater than or equal to a predetermined delay resolution of the receiving station, and the difference between the maximum delay amount and the minimum delay amount among the candidate values is less than or equal to a predetermined maximum delay. Then, it is possible to obtain a path diversity effect even if a plurality of relay stations select different delay amounts.

With the PSK-RZ scheme, the delay amounts that can be selected by the relay stations can be determined so that the delay amount difference is greater than or equal to a value that is several times less than the symbol length, being the delay resolution, and the difference between the maximum delay amount and the minimum delay amount is less than 1 symbol. With the DSK scheme, they can be determined so that the delay amount difference is greater than or equal to a value that is several times less than the symbol length, being the delay resolution, and the difference between the maximum delay amount and the minimum delay amount is less than 0.5 symbol.

In a case where an equalizer is used, they can be determined so that the delay amount difference is greater than or equal to 1 symbol, and the difference between the maximum delay amount and the minimum delay amount is less than or equal to the maximum delay, which is determined by the number of taps.

Figure 22:
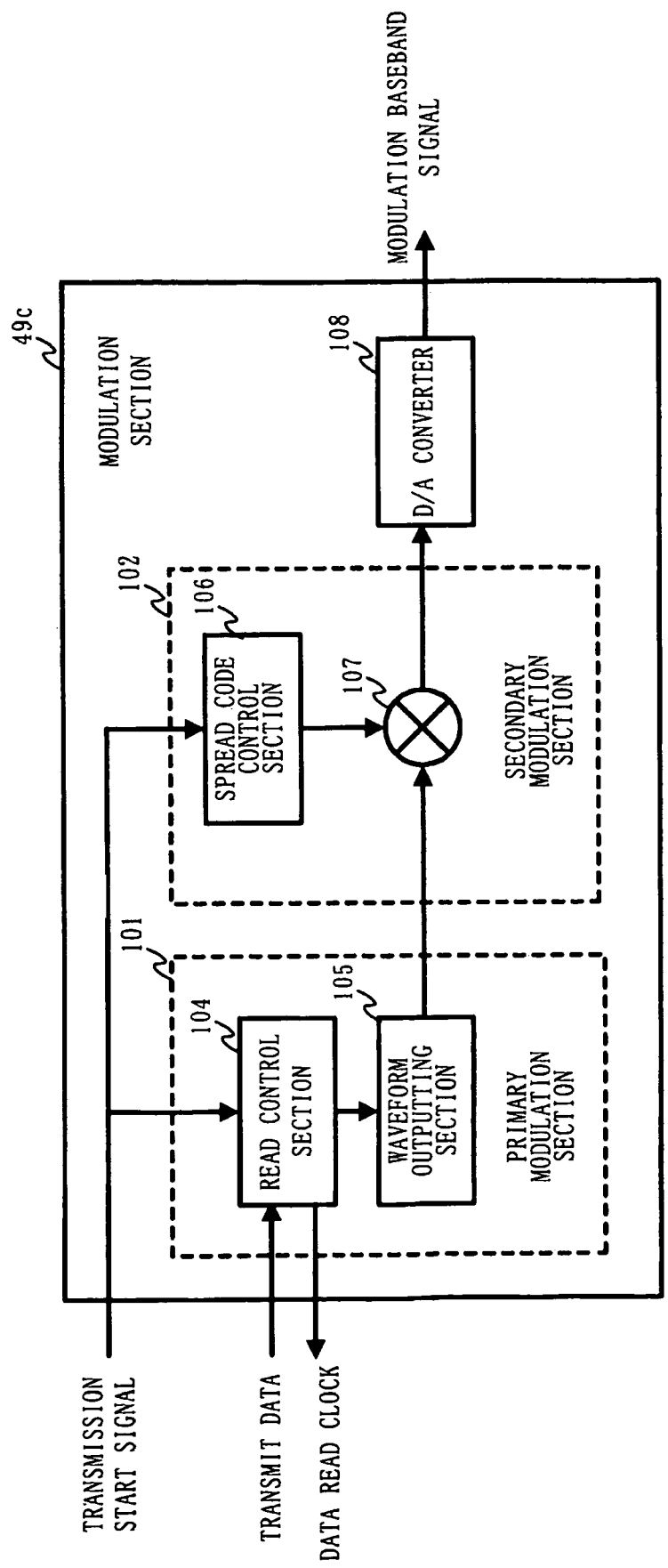
FIG. 22 is a block diagram showing a configuration of a modulation section 49c in a case where the DSSS scheme is used for communication.

FIG. 22 is a block diagram showing a configuration of a modulation section 49*c* in a case where the DSSS scheme is used for communication. Referring to FIG. 22, the modulation section 49*c* includes a primary modulation section 101 and a secondary modulation section 102. The primary modulation section 101 includes a read control section 104 and a waveform outputting section 105. The secondary modulation section 102 includes a spread code control section 106 and a multiplier 107.

In the primary modulation section 101, the read control section 104 produces a read clock in response to the generation of the transmission start signal. Then, the read control section 104 outputs the produced read clock to the packet processing section 46, receives transmit data, and passes an address signal based on the transmit data to the waveform outputting section 105. The waveform outputting section 105 has modulation waveform data stored in the waveform memory in advance, and reads out the modulation waveform data according to the address signal to output it as a primary modulation signal.

In the secondary modulation section 102, the spread code control section 106 outputs a spread signal to the multiplier 107 in response to the transmission start signal. The multiplier 107 spreads the primary modulation signal with the spread signal. A D/A converter 108 converts the spread digital signal into an analog signal, and outputs it as a modulation baseband signal. Thus, in response to the transmission start signal, the modulation section 49*c* starts the signal spreading operation. Therefore, it is possible to transmit data while adding a predetermined delay amount.

In the third and fourth embodiments, a timing signal for estimating the delay amount of the other station is needed. A method for obtaining a timing for estimating the delay amount of the other station, where the DSSS scheme is used, will now be described.

Figure 23:
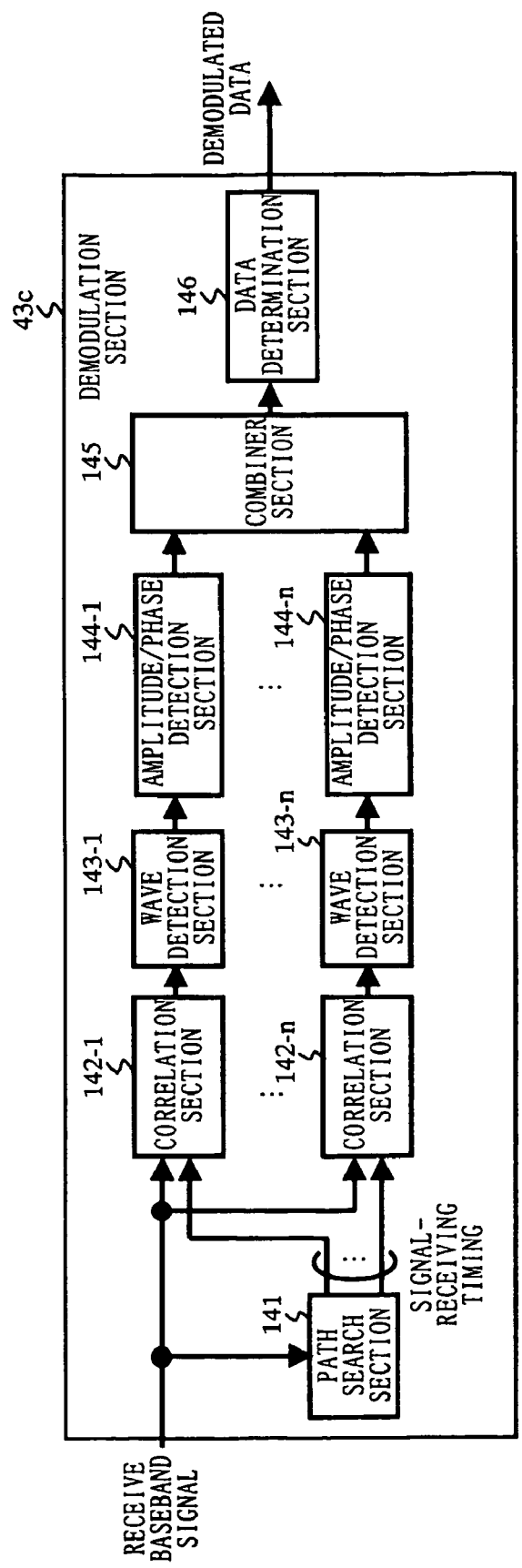
FIG. 23 is a block diagram showing a configuration of a demodulation section 43c in a case where the DSSS scheme is used for communication.

FIG. 23 is a block diagram showing a configuration of a demodulation section 43*c* in a case where the DSSS scheme is used for communication. The demodulation section 43*c* includes a path search section 141, correlation sections 142-1 to 142-*n* (n: a natural number greater than or equal to 2), wave detection sections 143-1 to 143-*n*, amplitude/phase detection sections 144-1 to 144-*n*, a combiner section 145, and a data determination section 146.

The path search section 141 obtains the sliding correlation between the receive baseband signal and the spread code for each chip, thereby detecting the signal-receiving timings of the delayed waves. The correlation sections 142-1 to 142-*n* each obtain the correlation between a delayed wave and the spread code based on the signal-receiving timing of the delayed wave detected by the path search section 141.

The wave detection sections 143-1 to 143-*n* detect the output signals from the correlation sections 142-1 to 142-*n*. The amplitude/phase detection sections 144-1 to 144-*n* detect the amplitude/phase information of signals detected by the wave detection sections 143-1 to 143-*n*. The combiner section 145 combines the signals together based on the amplitude/phase information detected by the amplitude/phase detection sections 144-1 to 144-*n*.

The data determination section 146 determines the combined signal from the combiner section 145 to obtain demodulated data. The signal-receiving timing of each delayed wave detected by the path search section 141 is compared with the reference timing. Thus, it is possible to estimate the delay amount selected by the other station.

In the DSSS scheme, the delay resolution corresponds to the 1-chip length of the spread code, and the maximum delay corresponds to the spread code length. Therefore, in a case where the modulation section 49c shown in FIG. 22 and the demodulation section 43c shown in FIG. 23 are used, the delay amounts may be determined so that the delay amount difference is greater than or equal to the 1-chip length, and the difference between the maximum delay amount and the minimum delay amount is less than the spread code length.

Figure 24:
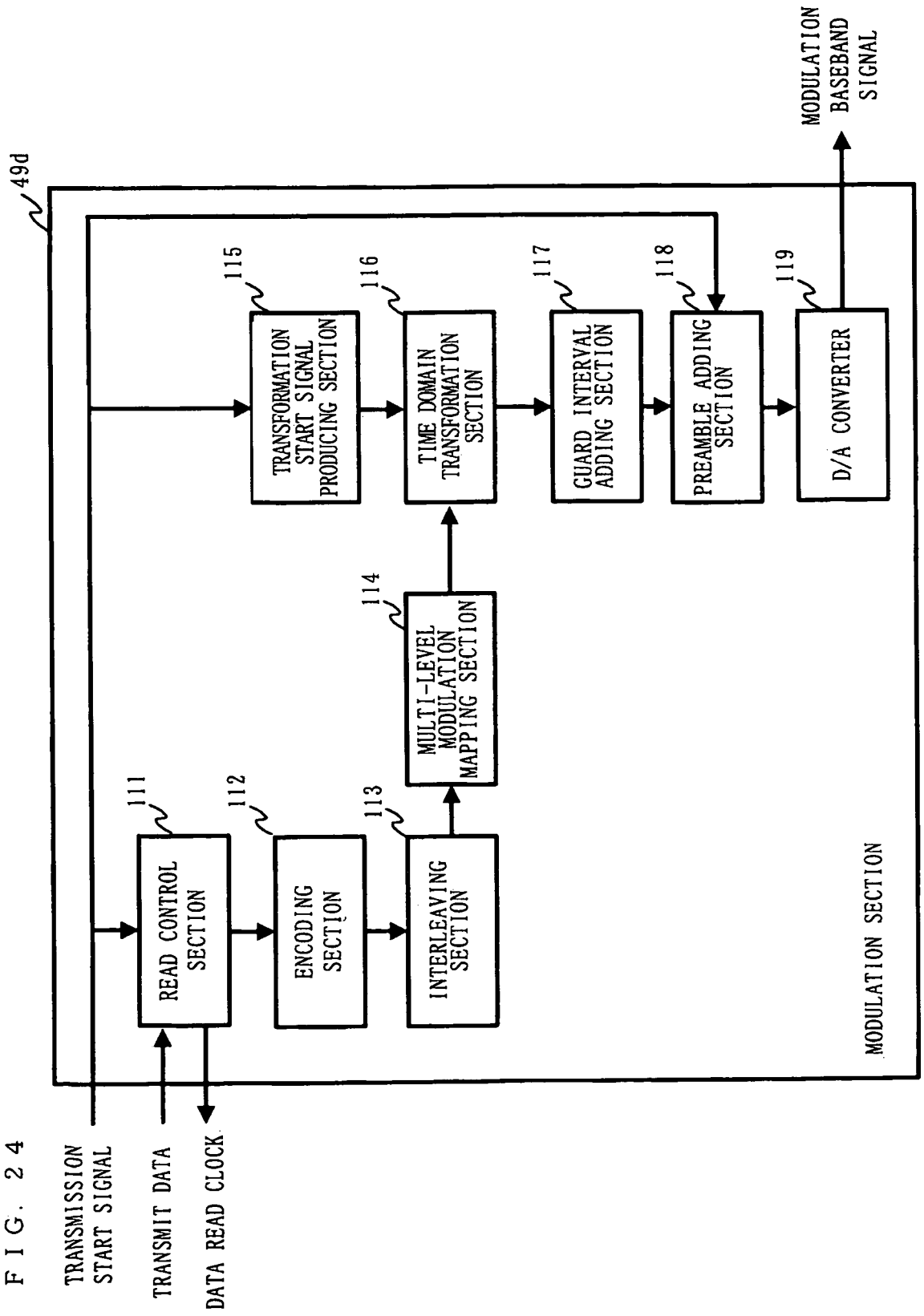
FIG. 24 is a block diagram showing a configuration of a modulation section 49d in a case where the OFDM scheme is used for communication.

FIG. 24 is a block diagram showing a configuration of a modulation section 49d in a case where the OFDM scheme is used for communication. Referring to FIG. 24, the modulation section 49d includes a read control section 111, an encoding section 112, an interleaving section 113, a multi-level modulation mapping section 114, a modulation start signal producing section 115, a time domain transformation section 116, a guard interval adding section 117, a preamble adding section 118, and a D/A converter 119.

The operation of the read control section 111 is similar to that of the read control section 61 shown in FIG. 5. The read control section 111 outputs the produced read clock to the transmit packet processing section 46 and receives the transmit data, and the read control section 111 passes it to the encoding section 112.

The encoding section 112 performs an encoding operation for error correction by using convolution encoding, for example. The interleaving section 113 performs an interleave operation on the signal encoded by the encoding section 112. The multi-level modulation mapping section 114 performs a symbol mapping operation using a digital modulation scheme such as PSK or QAM on the interleaved signal to produce a frequency domain signal.

When the transformation start signal producing section 115 receives a transmission start signal from the transmission timing control section 47, the transformation start signal producing section 115 produces a transformation start signal indicating the timing at which the frequency domain signal is transformed into a time domain signal and passes it to the time domain transformation section 116.

When the time domain transformation section 116 receives the transformation start signal on the receiver side, the time domain transformation section 116 transforms the frequency domain signal into a time domain signal being an OFDM signal. The guard interval adding section 117 adds a guard interval to each symbol of the OFDM signal to output an OFDM modulated signal.

The preamble adding section 118 adds, to a signal, a preamble to be used in the synchronization operation. The D/A converter 119 converts the digital OFDM signal with the preamble added thereto into an analog signal, and outputs it as a modulation baseband signal.

Figure 25:
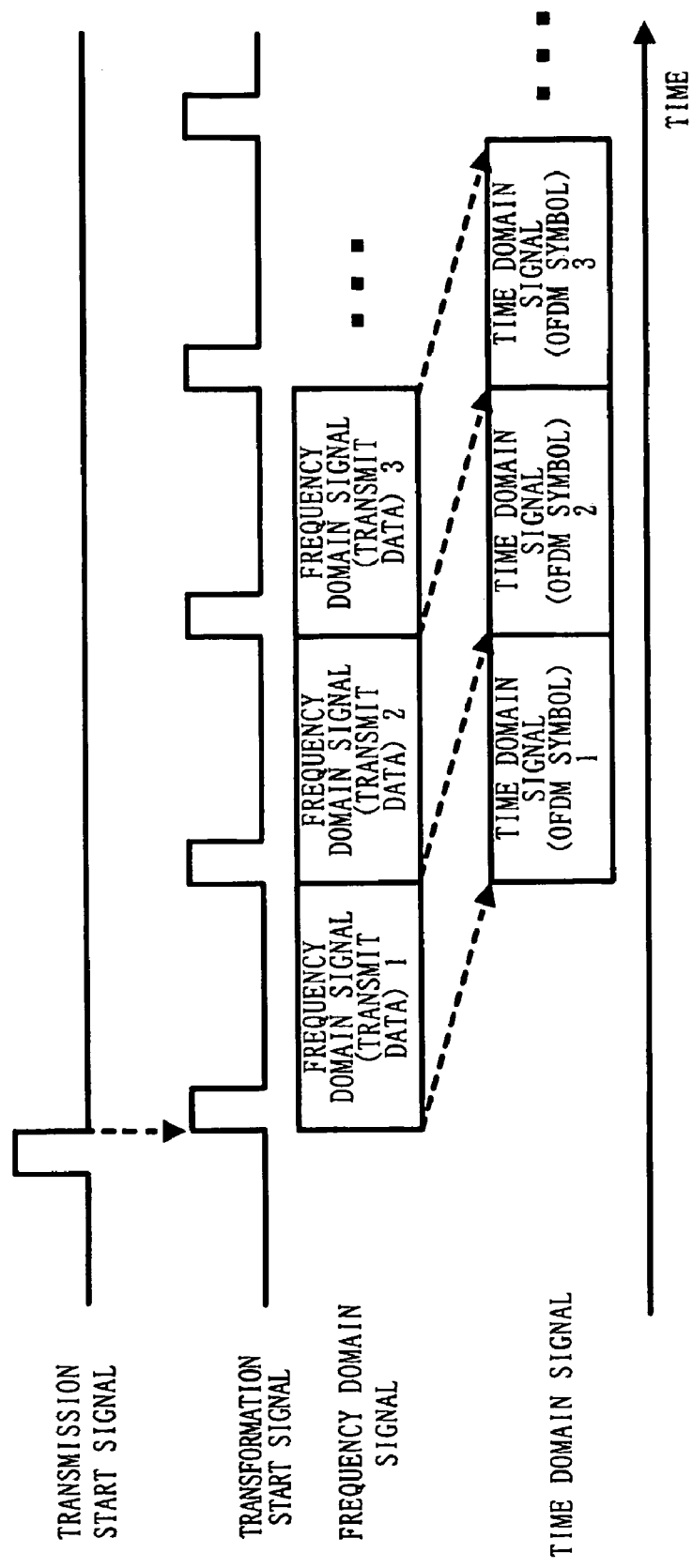
FIG. 25 is a timing diagram showing a signal produced in an important part of the modulation section 49d shown in FIG. 24 and a transmission start signal.

FIG. 25 is a timing diagram showing a signal produced in an important part of the modulation section 49d shown in FIG. 24 and a transmission start signal.

In the modulation section 49d, when the transformation start signal producing section 115 receives a transmission start signal from the transmission timing control section 47, the transformation start signal producing section 115 produces a transformation start signal. The time domain transformation section 116 transforms the frequency domain signal into a time domain signal, thus producing an OFDM symbol, according to the timing indicated by the transformation start signal. Thus, when a transmission start signal is received, the modulation section 49d modulates the transmit data and starts outputting the modulation baseband signal. Thus, it is possible to transmit data while adding a predetermined delay amount.

With the OFDM scheme, if the multipath TDOA is within the guard interval, there will be no intersymbol interference and thus no error. Moreover, an error correction is typically performed over a plurality of carriers. Thus, it is possible to better exert the path diversity effect with a frequency-selective fading environment where a plurality of notches occur in the spectrum, than with a flat fading environment where the overall spectrum drops down. Moreover, with the OFDM scheme, the delay resolution corresponds to the inverse of the frequency bandwidth, and the maximum delay corresponds to the guard interval length. Therefore, in a case where the modulation section 49d shown in FIG. 24 and a demodulation section 43d shown in FIG. 26 are used, the delay amounts may be determined so that the delay amount difference is greater than or equal to the inverse of the frequency bandwidth, and the difference between the maximum delay amount and the minimum delay amount is less than or equal to the guard interval length.

In the third and fourth embodiments, a timing signal for estimating the delay amount of the other station is needed. A method for obtaining a timing for estimating the delay amount of the other station, where the OFDM scheme is used, will now be described.

Figure 26:
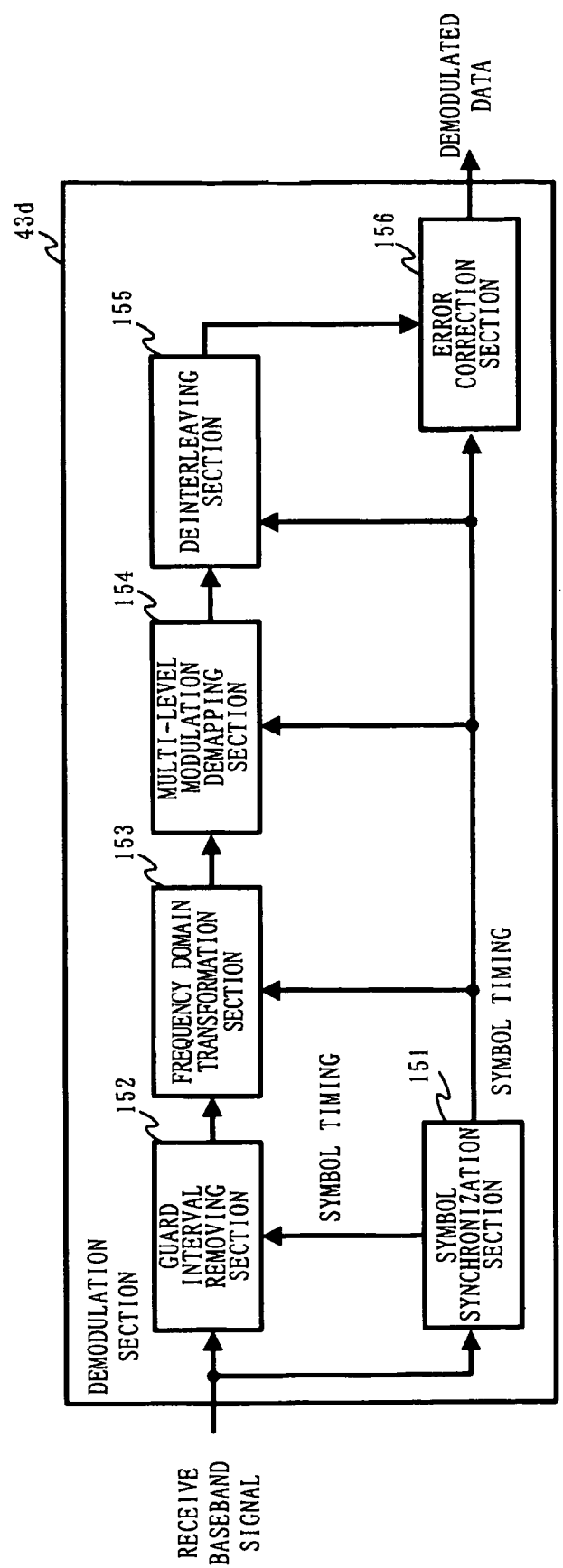
FIG. 26 is a block diagram showing a configuration of a demodulation section 43d in a case where the OFDM scheme is used for communication.

FIG. 26 is a block diagram showing a configuration of the demodulation section 43d in a case where the OFDM scheme is used for communication. Referring to FIG. 26, the demodulation section 43d includes a symbol synchronization section 151, a guard interval removing section 152, a frequency domain transformation section 153, a multi-level modulation demapping section 154, a deinterleaving section 155, and an error correction section 156.

The symbol synchronization section 151 synchronizes the OFDM symbols based on the receive baseband signal, and outputs a symbol timing signal. The symbol timing signal is used as a timing signal for internal operations of various sections. The guard interval removing section 152 removes the guard interval included in each OFDM symbol of the receive baseband signal.

The frequency domain transformation section 153 transforms a time domain signal into a frequency domain signal. The multi-level modulation demapping section 154 obtains determination data from the frequency domain signal through a demapping operation on the multi-level modulation constellation. The deinterleaving section 155 performs a deinterleave operation on the determination data. The error correction section 156 performs an error correction operation on the deinterleaved data to output demodulated data. For example, a Viterbi decoding operation is performed where convolution encoding is used in the error correction operation.

Figure 27:
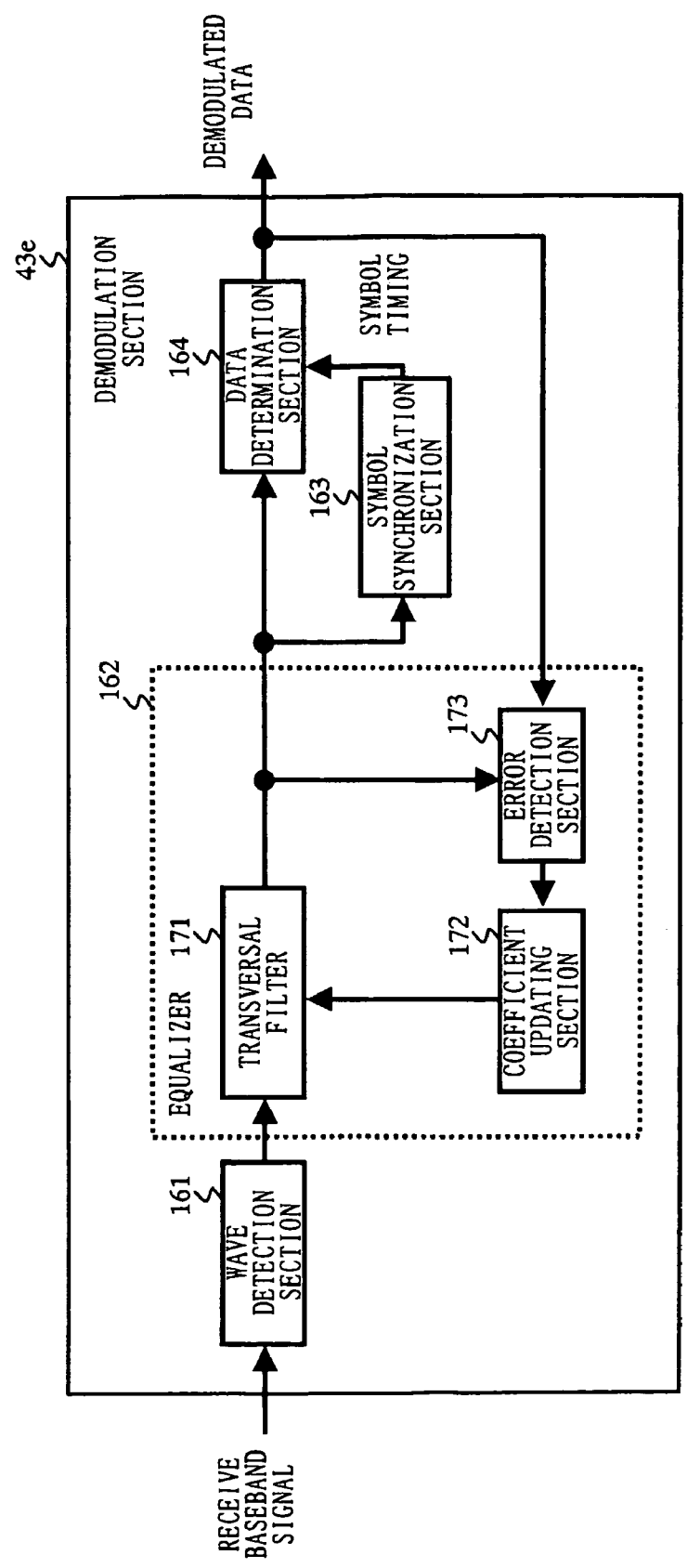
FIG. 27 is a block diagram showing a configuration of a demodulation section 43e in a case where an equalizer is used.

FIG. 27 is a block diagram showing a configuration of a demodulation section 43e in a case where an equalizer is used. The demodulation section 43e includes a wave detection section 161, an equalizer 162, a symbol synchronization section 163, and a data determination section 164. The equalizer 162 includes a transversal filter 171, a coefficient updating section 172, and an error detection section 173.

The transversal filter 171 equalizes the receive baseband signal according to the filter coefficient outputted from the coefficient updating section 172. The symbol synchronization section 163 performs a clock recovery operation based on the signal equalized through the transversal filter 171 to recover the symbol timing. The data determination section 164 samples the equalized signal according to the symbol timing to obtain demodulated data.

The error detection section 173 detects an error between the signal equalized through the transversal filter 171 and the demodulated data outputted from the data determination section 164. The coefficient updating section 172 updates the filter coefficient for the transversal filter 171 based on the error detected by the error detection section 173. By comparing the symbol timing recovered by the symbol synchronization section 163 with the reference symbol timing, it is possible to estimate the delay amount of the other station.

Moreover, where a timing signal is needed for estimating the delay amount of the other station in the third and fourth embodiments, the symbol timing can be obtained, with the PSK-RZ scheme and the DSK scheme, by performing a clock recovery operation based on the signal resulting after the differential detection operation, as with the PSK-VP scheme shown in FIG. 17. Where it is not necessary to estimate the delay amount of the other station as in the first and second embodiments, it is not necessary to compare the recovered symbol timing with the reference symbol timing.

Note that while the reference timing is determined in the first to fourth embodiments based on the reception completion signal indicating the completion of the packet reception, the method for determining the reference timing is not limited to this. For example, the reference timing may be determined based on the point in time at which the unique word in a packet is detected. If there is a beacon station for the synchronization between wireless stations, the reference timing may be determined based on a beacon signal received from the beacon station, or the reference time may alternatively be obtained based on the time information contained in a GPS (global positioning system) signal or the time information obtained from a radio-controlled clock.

Moreover, modulation/demodulation schemes other than those specifically mentioned in the first to fourth embodiments may be used for communication. The modulation/demodulation scheme is not limited to any particular scheme as long as the modulation scheme combined with the demodulation scheme can exert an anti-multipath property.

Note that in the present embodiment, the transmission start timing of the wireless station is determined by the transmission timing control section. The transmission timing control section determines the transmission start timing to be a timing obtained by delaying, by a delay amount, the reference timing indicated by the reference timing signal. Thus, an intended delay amount can be added to the transmission timing of each wireless station. However, the method of adding a delay amount is not limited to this. Another method of adding a delay amount may be, for example, adding a delay to the modulation baseband signal outputted from the modulation section.

Figure 28:
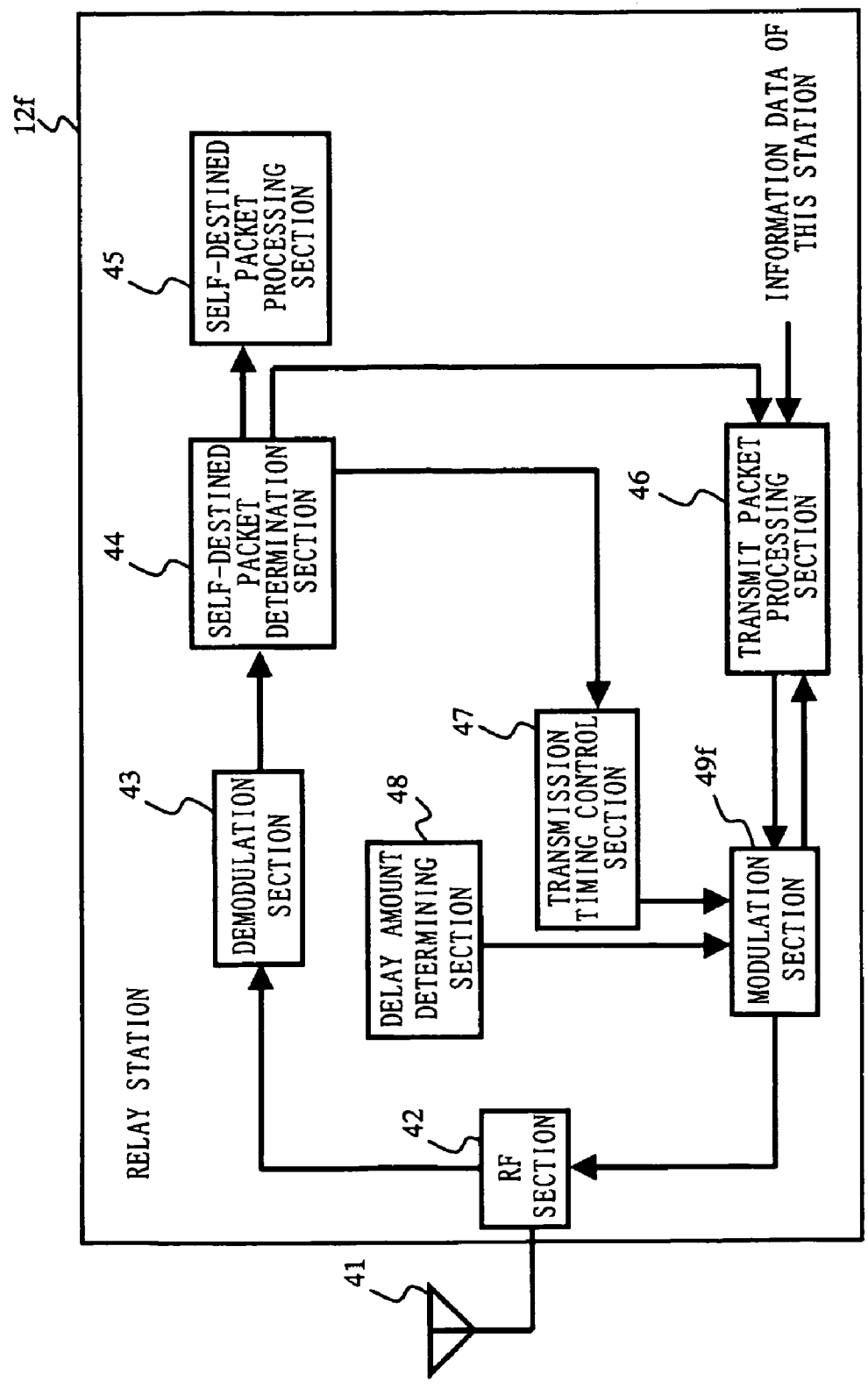
FIG. 28 is a block diagram showing a configuration of a relay station 12f in a case where the modulation section gives a delay to the modulation baseband signal.

FIG. 28 is a block diagram showing a configuration of a relay station 12*f* in a case where the modulation section gives a delay to the modulation baseband signal. The relay station 12*f* shown in FIG. 28 differs from the relay station 12 of the first embodiment shown in FIG. 4 in that the delay amount signal outputted from the delay amount determining section 48 is received by a modulation section 49*f*. Otherwise, the configuration is similar to that of FIG. 4. Therefore, the same reference numerals are used, and the configuration will not be further described below.

Figure 29:
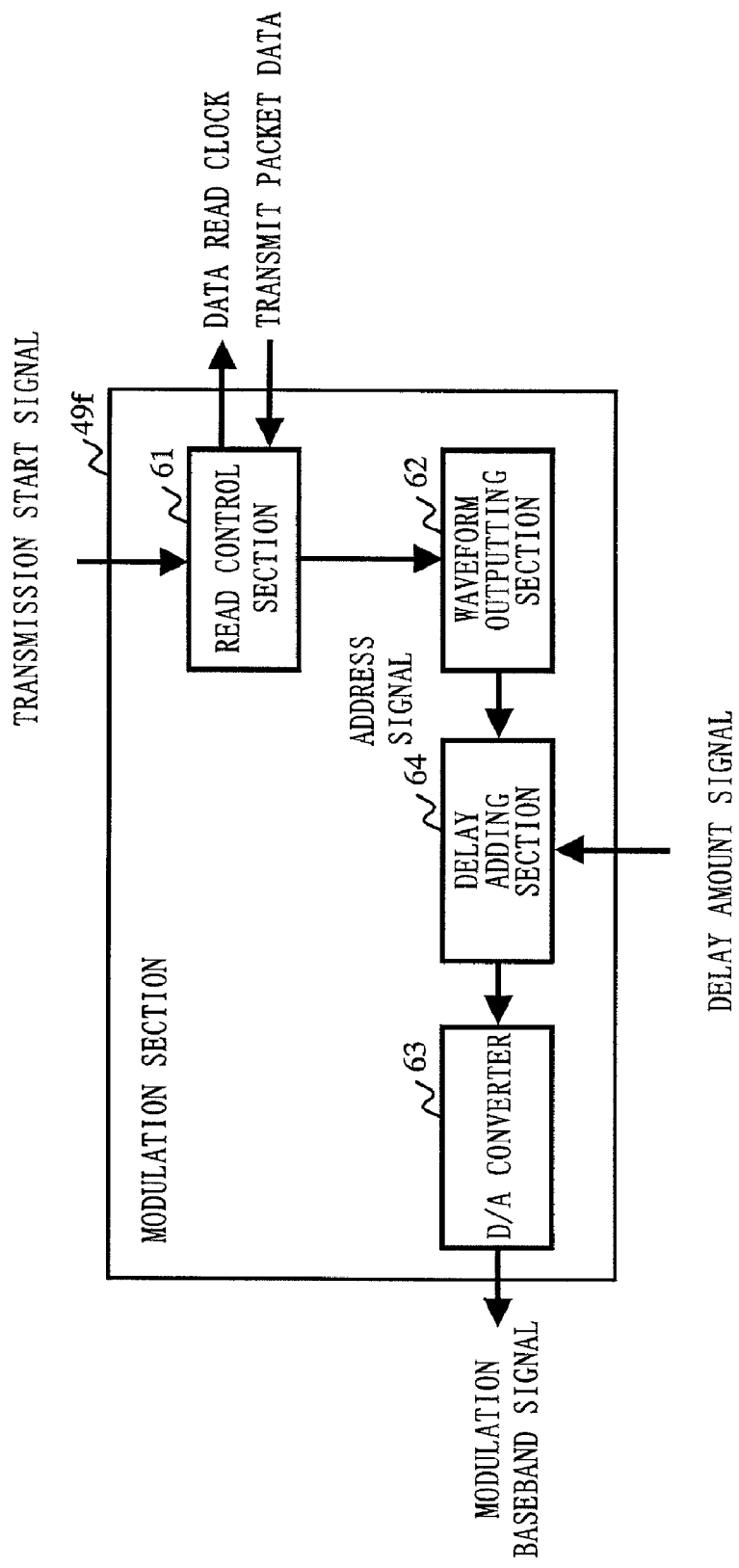
FIG. 29 is a block diagram showing a configuration of a modulation section 49f shown in FIG. 28.

FIG. 29 is a block diagram showing a configuration of the modulation section 49*f* shown in FIG. 28. The modulation section 49*f* shown in FIG. 29 differs from the modulation section 49 of the first embodiment shown in FIG. 5 in that the modulation section 49*f* further includes a delay adding section 64. Otherwise, the configuration is similar to that shown in FIG. 3. Therefore, the same reference numerals are used, and the configuration will not be further described below.

Figure 30:
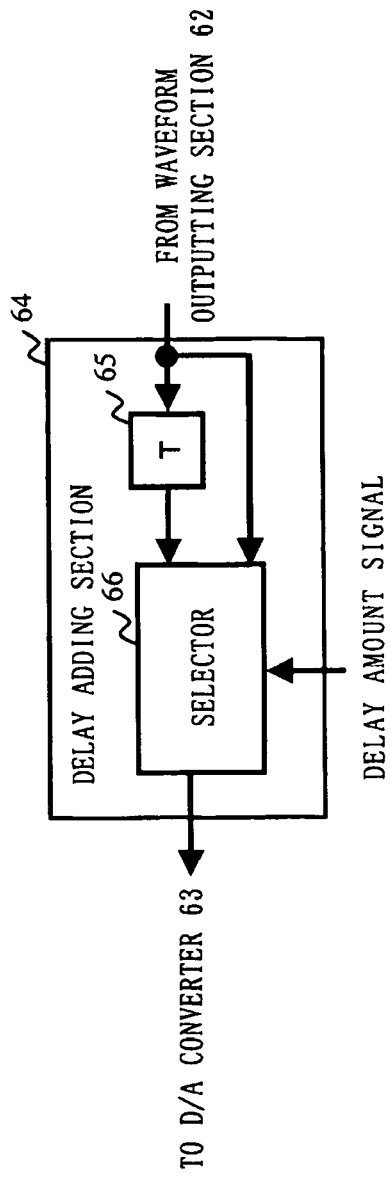
FIG. 30 is a block diagram showing an example of a detailed configuration of a delay adding section 64 shown in FIG. 29.

FIG. 30 is a block diagram showing an example of a detailed configuration of the delay adding section 64 shown in FIG. 29. Referring to FIG. 30, the delay adding section 64 includes a delay section 65 and a selector 66, and outputs a received signal while delaying it by a predetermined delay amount. The delay section 65 is formed by a shift register, and delays the signal from the waveform outputting section 62 by a predetermined amount of time T. The selector 66 selectively outputs one of the signal outputted from the delay section 65 and the signal outputted from the waveform outputting section 62. The selector 66 determines the signal to be selected according to the delay amount signal determined by the delay amount determining section 48. For example, if the delay amount signal indicates "T", the selector 66 selects the signal outputted from the delay section 65. If the delay amount signal indicates "0", the selector 66 selects the signal from the waveform outputting section 62. Then, the selector 66 outputs the selected signal to the D/A converter 63. Thus, it is possible to control the packet transmission timing by directly delaying the modulation baseband signal.

Note that while a case where there are two delay amount candidate values that can be selected by the delay adding section 64 has been described above with reference to FIG. 30, the number of delay amount candidate values may be three or more.

Moreover, while a case where a signal is delayed on a digital circuit has been described above with reference to FIG. 29, a signal may alternatively be delayed on an analog circuit. In such a case, the delay adding section 64 may be provided subsequent to the D/A converter 63.

Figure 31:
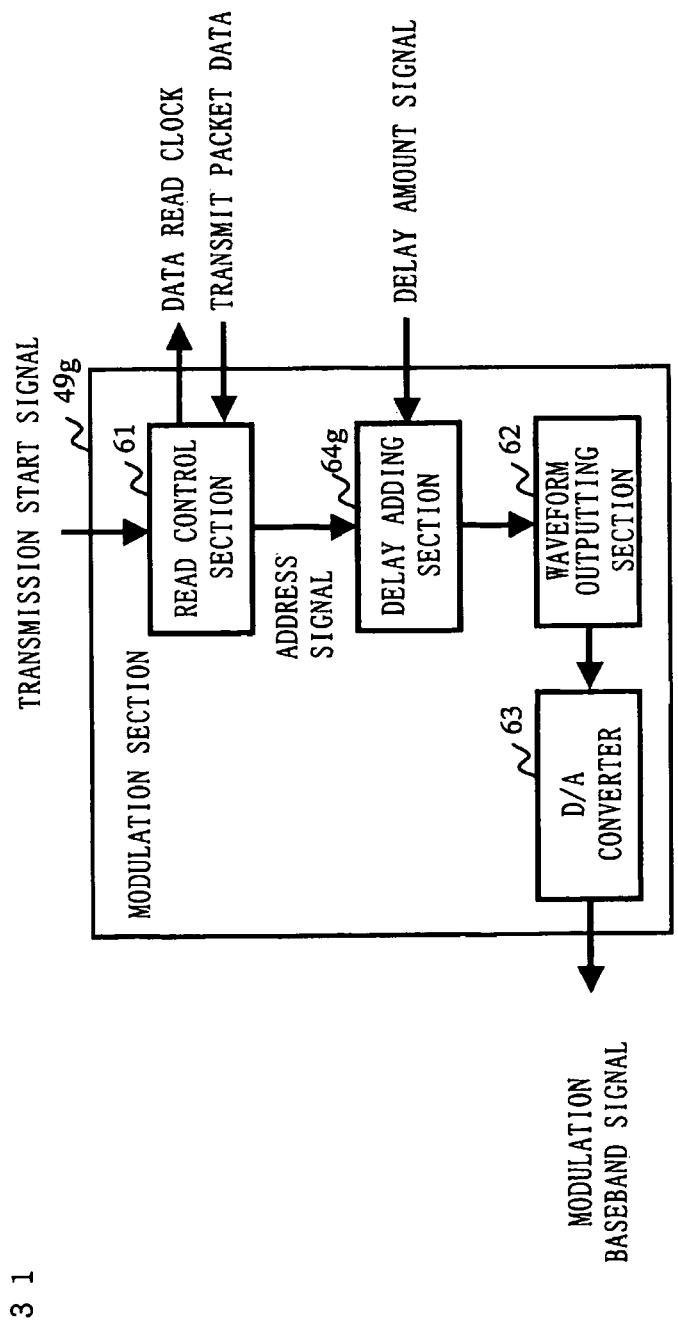
FIG. 31 is a block diagram showing a configuration of a modulation section 49g in a case where a delay adding section is provided between a read control section and a waveform outputting section.

Alternatively, a delay adding section may be provided between a read control section and a waveform outputting section so as to add a predetermined delay amount to an address signal outputted from the read control section. FIG. 31 is a block diagram showing a configuration of a modulation section 49*g* in a case where a delay adding section is provided between a read control section and a waveform outputting section.

A delay adding section 64*g* included in the modulation section 49*g* delays the address signal according to the delay amount signal determined by the delay amount determining section 48, and outputs it to the waveform outputting section 62. Note that the configuration and the operation of the delay adding section 64*g* are similar to those of the delay adding section 64 shown in FIG. 29, and will not be further described below. Thus, also in a case where a configuration as shown in FIG. 31 is implemented, the transmission timing at which to transmit the packet from the antenna 41 can be controlled, as in the first to fourth embodiments. The present invention is not limited to the examples described above as long as a plurality of wireless stations can each transmit data at a timing obtained by adding a predetermined delay amount to the reference timing.

Figure 32:
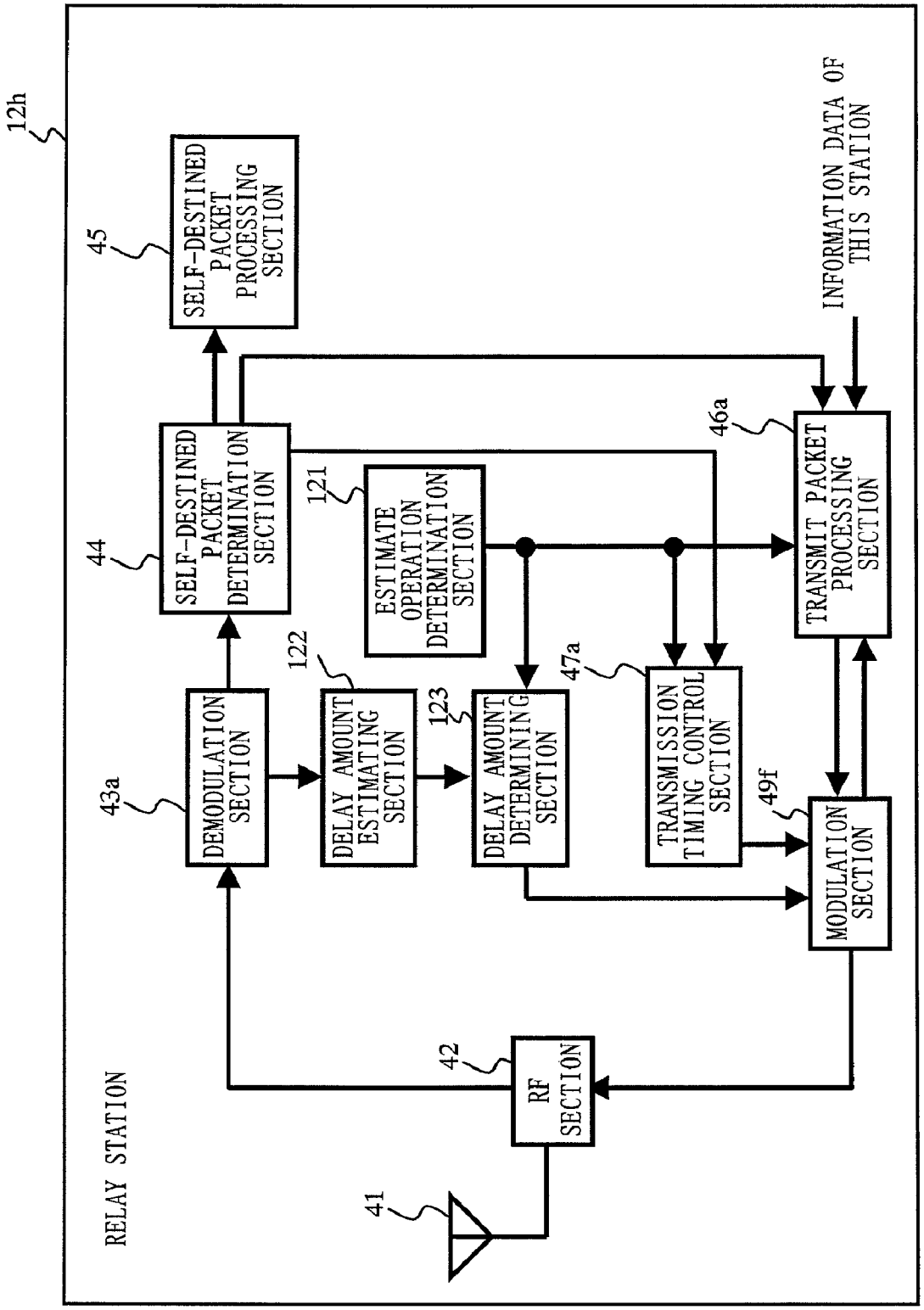
FIG. 32 is a block diagram showing a configuration of a relay station 12h in a case where the configuration of the relay station of the third embodiment is modified so that the modulation section directly delays the modulation baseband signal.
Figure 33:
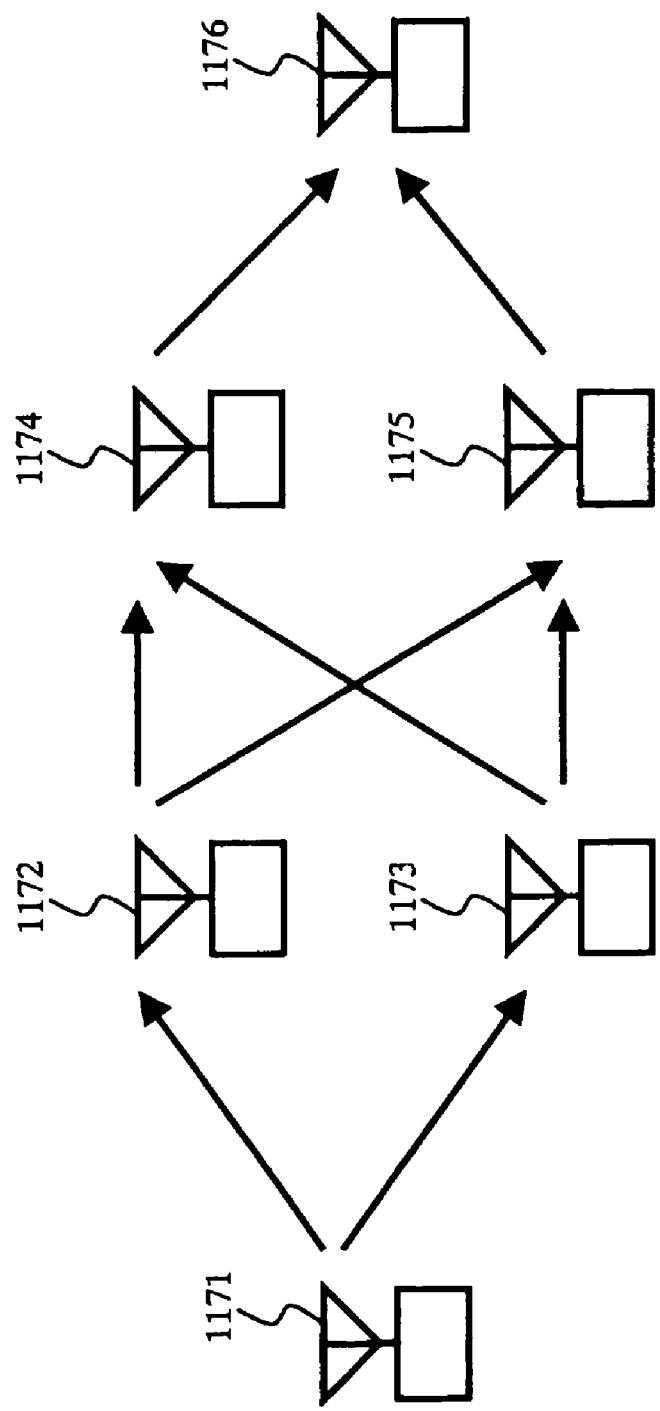
FIG. 33 shows a configuration of a conventional wireless transmission system disclosed in Patent Document 1.
Figure 34:
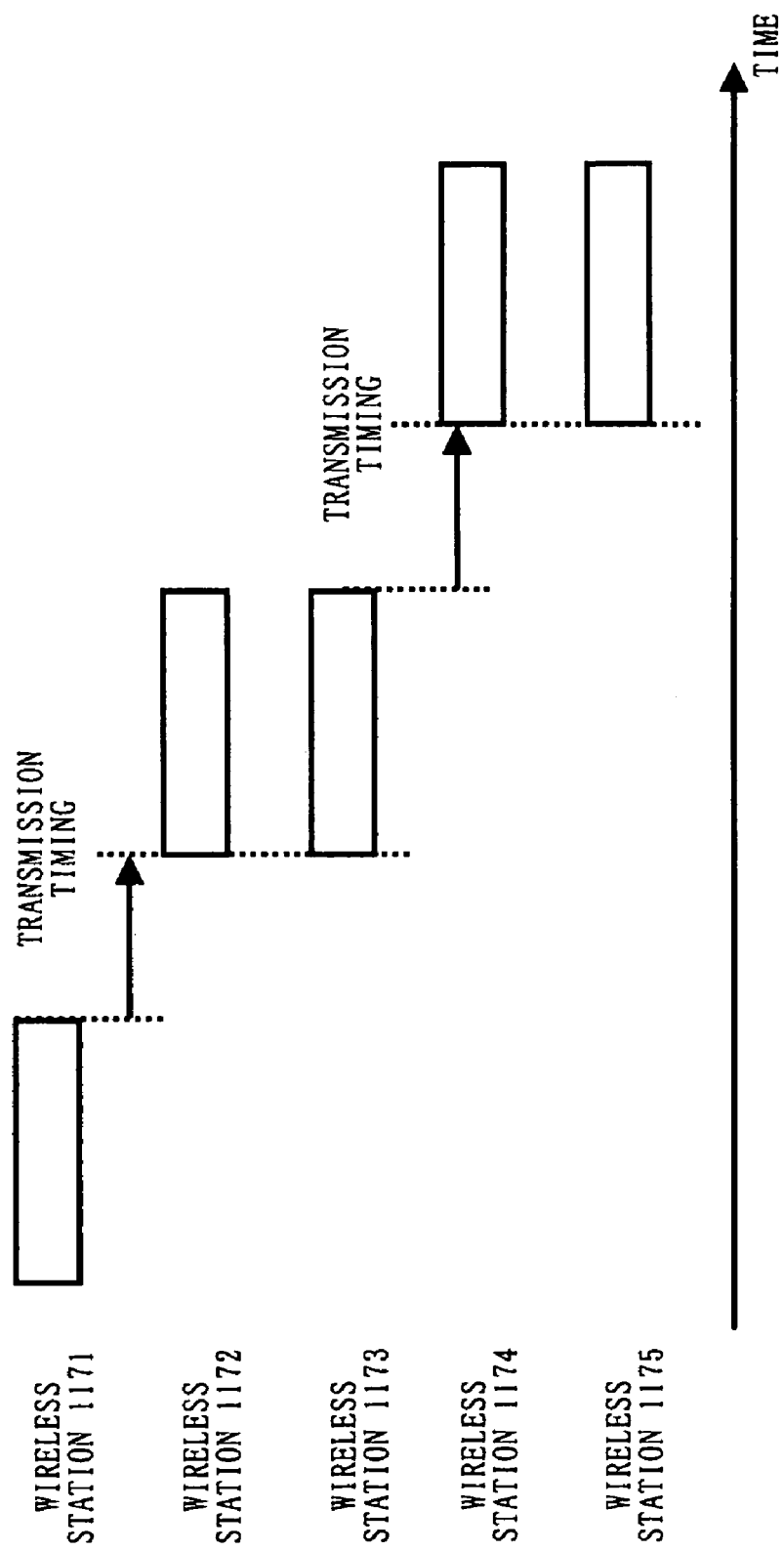
FIG. 34 is a schematic diagram showing the transmission timing of packets transmitted by wireless stations shown in FIG. 33.

FIG. 32 is a block diagram showing a configuration of a relay station 12*h* in a case where the configuration of the relay station of the third embodiment is modified so that the modulation section directly delays the modulation baseband signal. The relay station 12*h* shown in FIG. 32 differs from the relay station 12*a* of the third embodiment shown in FIG. 14 in that the delay amount signal outputted from the delay amount determining section 48 is received by the modulation section 49*f*. The configuration and the operation of the modulation section 49*f* are similar to those of the modulation section 49*f* shown in FIG. 28, and will not be further described below. Moreover, the configuration is otherwise similar to that shown in FIG. 14. Therefore, the same reference numerals are used, and the configuration will not be further described below.

The various functional blocks provided in the wireless station, such as the delay amount determining section or the transmission timing control section, as described above in the embodiments are typically each implemented in the form of an LSI being an integrated circuit. These functional blocks may be individually formed into a separate chip or some or all of them may be formed together into a single chip.

The present invention is useful as a wireless transmission system and a wireless transmission method in which a plurality of wireless stations transmit packets using a modulation/demodulation scheme with an anti-multipath property, wherein it is possible to increase the probability that a path diversity effect can be obtained, and as a wireless station, etc., for use therein.

The invention claimed is:

1. A wireless station for use in a wireless transmission system, the wireless transmission system having a plurality of wireless stations able to transmit packets, and having a path diversity system formed by a transmitter-side wireless station, a multi-path channel, and a receiver-side wireless station, the wireless station comprising:
   a delay amount determining section for randomly selecting a delay amount from among a plurality of candidate values as a delay amount for which to delay a packet transmission;
   a transmission timing control section for determining a transmission start timing to start the packet transmission, the transmission start timing being obtained by delaying a reference timing by the delay amount selected by the delay amount determining section, the reference timing being a reference for the packet transmission; and
   a transmitting section for transmitting the packet at the transmission start timing determined by the transmission timing control section,
   wherein a difference between any two candidate values of the plurality of candidate values is greater than or equal to a predetermined delay resolution, and a difference between a maximum candidate value of the plurality of candidate values and a minimum candidate value of the plurality of candidate values is less than or equal to a predetermined maximum delay, and
   wherein the predetermined delay resolution and the predetermined maximum delay are set to values such that a plurality of delayed waves can be received with path diversity.

2. The wireless station according to claim 1, further comprising a receiving section for receiving a packet to be transmitted to another wireless station,
   wherein the transmitting section transmits the packet received by the receiving section.

3. The wireless station according to claim 2, further comprising a re-transmission timing control section for determining a re-transmission start timing at which to re-transmit a packet transmitted by the wireless station to a wireless station which is not the receiver-side wireless station, the re-transmission start timing being a timing obtained by adding the delay amount determined by the delay amount determining section to the reference timing after the packet transmitted by the wireless station is transmitted,
   wherein the transmitting section is further for transmitting the packet to a wireless station which is the receiver-side wireless station at the re-transmission start timing determined by the re-transmission timing control section.

4. The wireless station according to claim 3, wherein the delay amount determining section randomly selects a delay amount from candidate values of the plurality of candidate values which are not contained in a plurality of candidate values stored in another wireless station of the plurality of wireless stations when the packet is re-transmitted.

5. The wireless station according to claim 2, further comprising:
   an estimate operation determination section for determining whether to estimate a delay amount selected by another wireless station of the plurality of wireless stations;
   a packet producing section for producing the packet, the packet having a preamble, the preamble in a case in which the estimate determination section determines not to estimate the delay amount being longer than the preamble in a case in which the estimate determination section determines to estimate the delay amount; and
   a delay amount estimating section for estimating the delay amount selected by the other wireless station based on a preamble contained in a packet transmitted by the other wireless station if the estimate operation determination section determines to estimate the delay amount selected by the other wireless station,
   wherein the delay amount determining section randomly selects a delay amount from candidate values of the plurality of candidate values that are different from the value estimated by the delay amount estimating section,
   wherein the transmission timing control section further subtracts a difference in length between a preamble contained in the packet produced by the packet producing section and a preamble contained in the packet received by the receiving section from the transmission start timing, and
   wherein the transmitting section transmits the packet produced by the packet producing section.

6. The wireless station according to claim 5, wherein the delay amount estimating section includes:
   a symbol timing recovering section for recovering a symbol timing of a preamble contained in the packet transmitted at the transmission start timing; and
   a delay amount comparing section for estimating a delay amount selected by the other wireless station by comparing the symbol timing recovered by the symbol timing recovering section with a reference symbol timing.

7. The wireless station according to claim 5, wherein the delay amount estimating section includes:
   a reception level detection section for detecting a reception level of the packet transmitted at the transmission start timing; and
   a delay amount comparing section for estimating the delay amount selected by the other wireless station by comparing a timing at which the reception level is detected by the reception level detection section with a reference symbol timing.

8. The wireless station according to claim 1, wherein a Phase Shift Keying with Varied Phase (PSK-VP) scheme is used as the modulation scheme.

9. The wireless station according to claim 1, wherein an Orthogonal Frequency Division Multiplexing (OFDM) scheme is used as the modulation scheme and the demodulation scheme.

10. A wireless transmission system comprising:
    a plurality of wireless stations able to transmit packets, and having a path diversity system formed by a transmitter-side wireless station, a multi-path channel, and a receiver-side wireless station, each wireless station including:

a delay amount determining section for randomly selecting a delay amount from among a plurality of candidate values as a delay amount for which to delay a packet transmission;

a transmission timing control section for determining a transmission start timing to start the packet transmission, the transmission start timing being obtained by delaying a reference timing by the delay amount selected by the delay amount determining section, the reference timing being a reference for the packet transmission;

a transmitting section for transmitting the packet at the transmission start timing determined by the transmission timing control section; and a receiving section for receiving a packet to be transmitted to another wireless station, wherein a difference between any two candidate values of the plurality of candidate values is greater than or equal to a predetermined delay resolution, and a difference between a maximum candidate value of the plurality of candidate values and a minimum candidate value of the plurality of candidate values is less than or equal to a predetermined maximum delay, and wherein the predetermined delay resolution and the predetermined maximum delay are set to values such that a plurality of delayed waves can be received with path diversity.

11. A method for transmitting a packet from a wireless station for use in a system having a plurality of wireless stations able to transmit packets, and having a path diversity system formed by a transmitter-side wireless station, a multi-path channel, and a receiver-side wireless station, the method comprising the steps of:

randomly selecting a delay amount from among a plurality of candidate values as a delay amount for which to delay a packet transmission;

determining a transmission start timing to start the packet transmission, the transmission start timing being obtained by delaying a reference timing by the delay amount selected in the step of randomly selecting a delay amount, the reference timing being a reference for the packet transmission; and transmitting the packet at the transmission start timing determined in the step of determining a transmission start timing, wherein a difference between any two candidate values of the plurality of candidate values is greater than or equal to a predetermined delay resolution, and a difference between a maximum candidate value of the plurality of candidate values and a minimum candidate value of the plurality of candidate values is less than or equal to a predetermined maximum delay, and wherein the predetermined delay resolution and the predetermined maximum delay are set to values such that a plurality of delayed waves can be received with path diversity.

12. A method for use in a system in which a plurality of wireless stations transmit the same packet at a predetermined timing, wherein a path diversity system is formed by a transmitter-side wireless station, a multi-path channel, and a receiver-side wireless station, the method comprising the steps of:

randomly selecting a delay amount from among a plurality of candidate values as a delay amount for which to delay a packet transmission;

determining a transmission start timing to start the packet transmission, the transmission start timing being obtained by delaying a reference timing by the delay amount selected in the step of randomly selecting a delay amount, the reference timing being a reference for the packet transmission;

transmitting the packet to a recipient wireless station at the transmission start timing determined in the step of determining a transmission start timing; and receiving a packet transmitted from another wireless station, wherein a difference between any two candidate values of the plurality of candidate values is greater than or equal to a predetermined delay resolution, and a difference between a maximum candidate value of the plurality of candidate values and a minimum candidate value of the plurality of candidate values is less than or equal to a predetermined maximum delay, and wherein the predetermined delay resolution and the predetermined maximum delay are set to values such that a plurality of delayed waves can be received with path diversity.

* * * * *